US010524344B2

(12) United States Patent
Milchberg et al.

(10) Patent No.: US 10,524,344 B2
(45) Date of Patent: Dec. 31, 2019

(54) LASER-DRIVEN HIGH REPETITION RATE SOURCE OF ULTRASHORT RELATIVISTIC ELECTRON BUNCHES

(71) Applicant: University of Maryland, College Park, MD (US)

(72) Inventors: Howard M. Milchberg, Potomac, MD (US); Andrew Goers, Adelphi, MD (US); George Hine, College Park, MD (US); Fatholah Salehi, Hyattsville, MD (US); Linus Feder, Washington, DC (US); Bo Miao, College Park, MD (US)

(73) Assignee: University of Maryland, College Park, College Park, MD (US)

(*) Notice: Subject to any disclaimer, the term of this patent is extended or adjusted under 35 U.S.C. 154(b) by 248 days.

(21) Appl. No.: 15/595,675

(22) Filed: May 15, 2017

(65) Prior Publication Data

US 2017/0332468 A1 Nov. 16, 2017

Related U.S. Application Data

(60) Provisional application No. 62/336,068, filed on May 13, 2016.

(51) Int. Cl.
*H05G 2/00* (2006.01)
*H05H 15/00* (2006.01)
(Continued)

(52) U.S. Cl.
CPC ............. *H05G 2/008* (2013.01); *H05G 2/003* (2013.01); *H05H 15/00* (2013.01); *G21K 1/003* (2013.01); *H01J 35/00* (2013.01)

(58) Field of Classification Search
CPC .......... G21K 1/003; G21K 1/00; G21K 1/025; G21K 1/093; G21K 1/067; G21K 1/087;
(Continued)

(56) References Cited

U.S. PATENT DOCUMENTS

2006/0251217 A1* 11/2006 Kaertner .................. H05G 2/00 378/119
2010/0290587 A1* 11/2010 Umstadter ........... G01V 5/0016 378/57
(Continued)

OTHER PUBLICATIONS

Tajima et al., "Laser Electron Accelerator", Physical Review Letters, vol. 43, No. 4, pp. 267-270 (Jul. 1979).
(Continued)

*Primary Examiner* — Irakli Kiknadze
(74) *Attorney, Agent, or Firm* — Carter, DeLuca & Farrell LLP; George Likourezos, Esq.

(57) ABSTRACT

A laser-plasma-based acceleration system includes a focusing element and a laser pulse emission directing a laser beam to the focusing element to such that laser pulses transform into a focused beam and a chamber defining a nozzle having a throat and an exit orifice, emitting a critical density range gas jet from the exit orifice for laser wavelengths ranging from ultraviolet to the mid-infrared. the critical density range gas jet intersects the focused beam at an angle and in proximity to the exit orifice of the nozzle to define a point of intersection between the focused beam and the critical density range gas jet. In intersection with the critical density range gas jet, the pulsed focused beam drives a laser plasma wakefield relativistic electron beam. A corresponding method of laser-plasma-based acceleration is also described. The critical density range may include $2\times10^{20}$ $cm^{-3}$ to $5\times10^{21}$ $cm^{-3}$.

20 Claims, 12 Drawing Sheets

(51) Int. Cl.
*G01N 23/00* (2006.01)
*H01J 35/00* (2006.01)
*G21K 1/00* (2006.01)

(58) Field of Classification Search
CPC ..... G21K 1/16; G21K 2201/065; H01J 35/00; H01J 25/02; H01J 2237/141; H01J 2237/1415; H01J 23/06; H05G 2/003; H05G 2/008; H05G 2/001; H05G 2/00; H05H 15/00; H01S 4/00; H01L 2251/308; H01L 51/0052; H01L 51/0058; H01L 51/0072; H01L 51/0085; H01L 51/5016; G21F 1/02; A61N 2005/1088; A61N 2005/1089; A61N 5/1067; A61N 2005/1022; A61N 2005/109; A61N 5/1001; A61N 5/1017; A61N 5/103; A61N 5/1071; A61N 2005/1055
USPC ...................................... 378/1, 119, 136–138
See application file for complete search history.

(56) References Cited

U.S. PATENT DOCUMENTS

2016/0014874 A1* 1/2016 Kaganovich ........... H05G 2/008 378/119
2016/0225477 A1* 8/2016 Banine ............... G02B 27/0025
2016/0302295 A1* 10/2016 Umstadter ............. H05G 2/001
2016/0323985 A1* 11/2016 Kaertner .................. H05G 2/00

OTHER PUBLICATIONS

Leemans et al., "Multi-GeV Electron Beams from Capillary-Discharge-Guided Subpetawatt Laser Pulses in the Self-Trapping Regime", Physical Review Letters, PRL 113, 245002 (Dec. 2014).
Cipiccia et al., "Gamma-rays from harmonically resonant betatron oscillations in a plasma wake", Nature Physics, Letters, 7, 867 (Sep. 2011).
Mangles et al., "Table-top laser-plasma acceleration as an electron radiography source", Laser and Particle Beams, 24, 185-190 (2006).
Bussolino et al., "Electron radiography using a table-top laser-cluster plasma accelerator", J. Phys. D: Appl. Phys., 46, 455501 (2013).
Dopp et al., "A bremsstrahlung gamma-ray source based on stable ionization injection of electrons into a laser wakefield accelerator", Nucler Instruments and Methods in Physic Research A, 830, pp. 515-519 (2016).
Edwards et al., "Characterization of a gamma-ray source based on a laser-plasma accelerator with applications to radiography", Appl. Phys. Lett, 80, 2129 (2002).
He et al., "High repetition-rate wakefield electron source generated by few-millijoule, 30 fs laser pulses on a density downramp", New J. Phys., 15, 053016 (2013).
He et al., "Electron diffracton using ultrafast electron bunches from a laser-wakefield accelerator at kHz repetition rate", Apply Phys. Lett, 102, 064104 (2013).
Mordovanakis et al., "Quasimonoenergetic Electron Beams with Relativistic Energies and Ultrashort Duration from Laser-Solid Interactions at 0.5 kHz", PRL 103, 235001 (2009).
Feister et al., "Super-ponderomotive electron spectra from efficient, high-intensity, kHz laser-water interactions", https://arxiv.org/abs/1508.07374v2 (2015), 5 pages.
Miller, "Femtosecond Crystallography with Ultrabright Electrons and X-rays: Capturing Chemistry in Action", Science 343, 1108 (2014), 10 pages.
Esarey et al., "Physics of laser-driven plasma-based electron accelerators", Reviews of Modern Physics, vol. 81, 1229 (Jul.-Sep. 2009), 57 pages.
Sun et al., "Self-focusing of short intense pulses in plasmas", The Physics of Fluids, 30, 526 (1987), 8 pages.
Goers et al., "Multi-MeV electron acceleration by sub-terawatt laser pulses", Phys. Rev. Lett., 115, 194802 (2015), 9 pages.
Xiao et al., "Competition between stimulated Raman scattering and two-plasmon decay in inhomogenous plasma", Physics of Plasmas, 23, 022704 (2016), 12 pages.
Clark et al., "Time- and Space-Resolved Density Evolution of the Plasma Waveguide", vol. 78, No. 12, pp. 2373-2376 (Mar. 1997).
National Inst of Stand and Tech, "ESTAR, Stopping Power and Range Tables for Electrons", http://physics.nist.gov/PhysRefData/Star/Text/ESTAR.html, (2010), 1 page.
Glinec et al., "Absolute calibration for a broad range single shot electron spectrometer", Review of Scientific Instruments, 77, 103301 (2006), 7 pages.
Buck et al., "Absolute charge calibration of scintillating screens for relativistic electron detection", Review of Scientific Instruments, 81, 033301 (2010), 7 pages.
Augst et al., "Laser ionization of noble gases by Coulomb-barrier suppression", J. Opt. Soc. Am. B, vol. 8, No. 4 (Apr. 1991), 10 pages.
Gordon, "Improved Ponderomotive Guiding Center Algorithm", IEEE Trans on Plasma Science, vol. 35, No. 5, 1486 (Oct. 2007), 3 pages.
Langdon et al., "Nonlinear Saturation and Recurrence of the Two-Plasmon Decay Instability", Physical Review Letters, vol. 43, No. 2, 133 (Jul. 1979), 4 pages.
Goers et al., "Multi-MeV Electron Acceleration by Subterawatt Laser Pulses", PRL 115(19), 194802 (Nov. 2015), 5 pages.
Salehi et al., "MeV electron acceleration at 1 kHz with <10 mJ laser pulses", Optics Letters, vol. 42, No. 2, pp. 215-218 (Jan. 2017).
Feister et al., "Relativistic electron acceleration by mJ-class kHz lasers normally incident on liquid targets", Optics Express, vol. 25, No. 16 (Aug. 2017), 15 pages.
Guenot et al., "Relativistic electron beams driven by kHz single-cycle light pulses", Nature Photonics, DOI: 10.1038/NPHOTON,2017.46 (Apr. 2017), 5 pages.

* cited by examiner

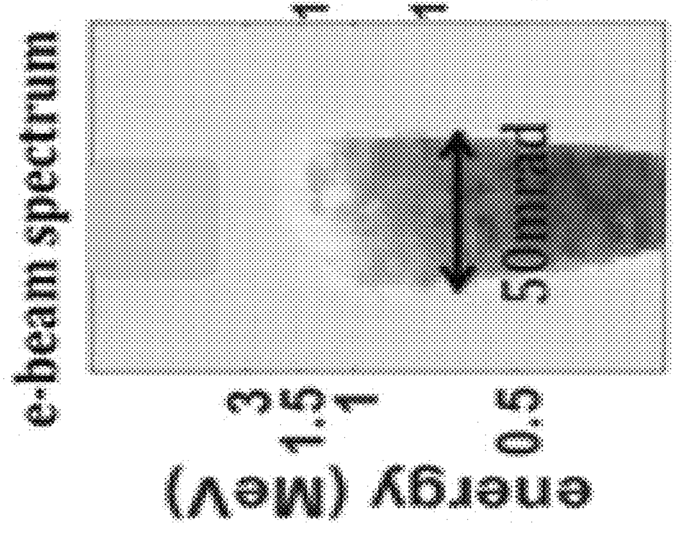
FIG. 2B1
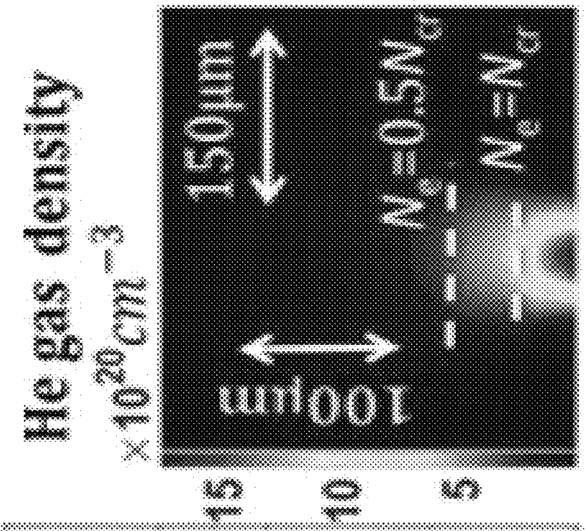
FIG. 2B2
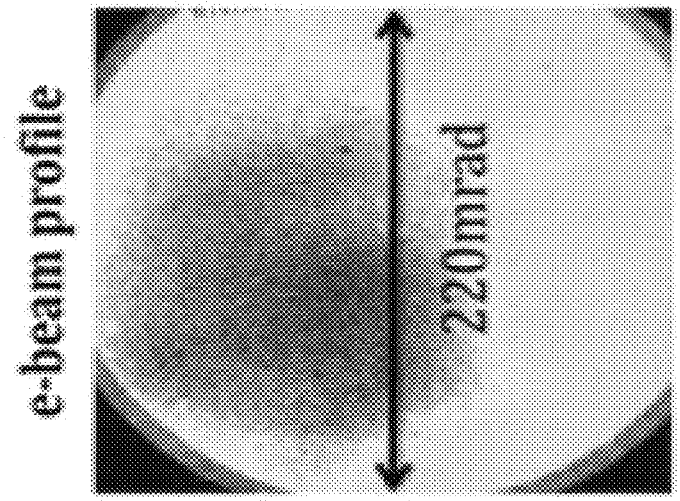
FIG. 2B3

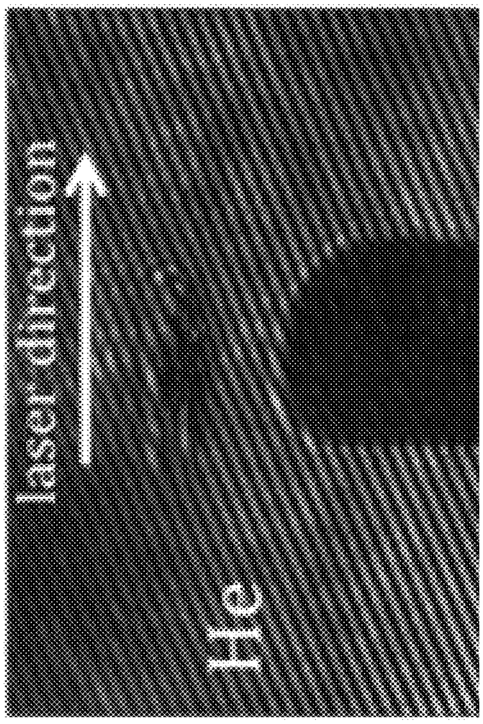
FIG. 2C2
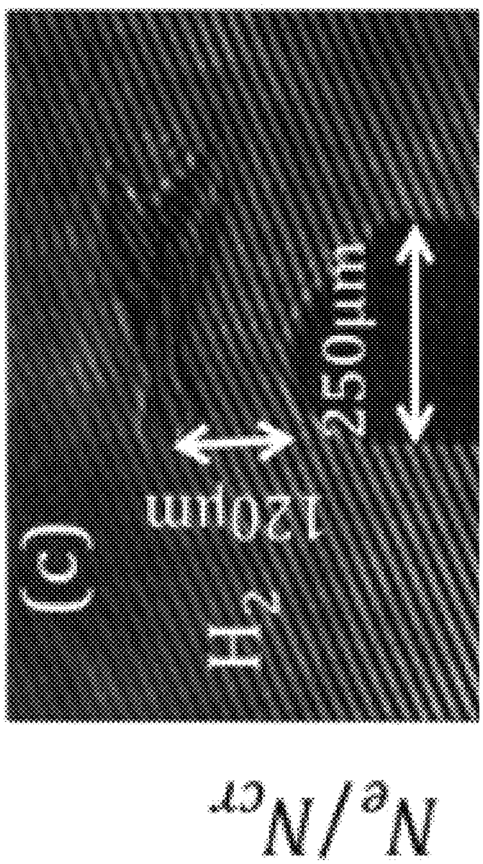
FIG. 2C1

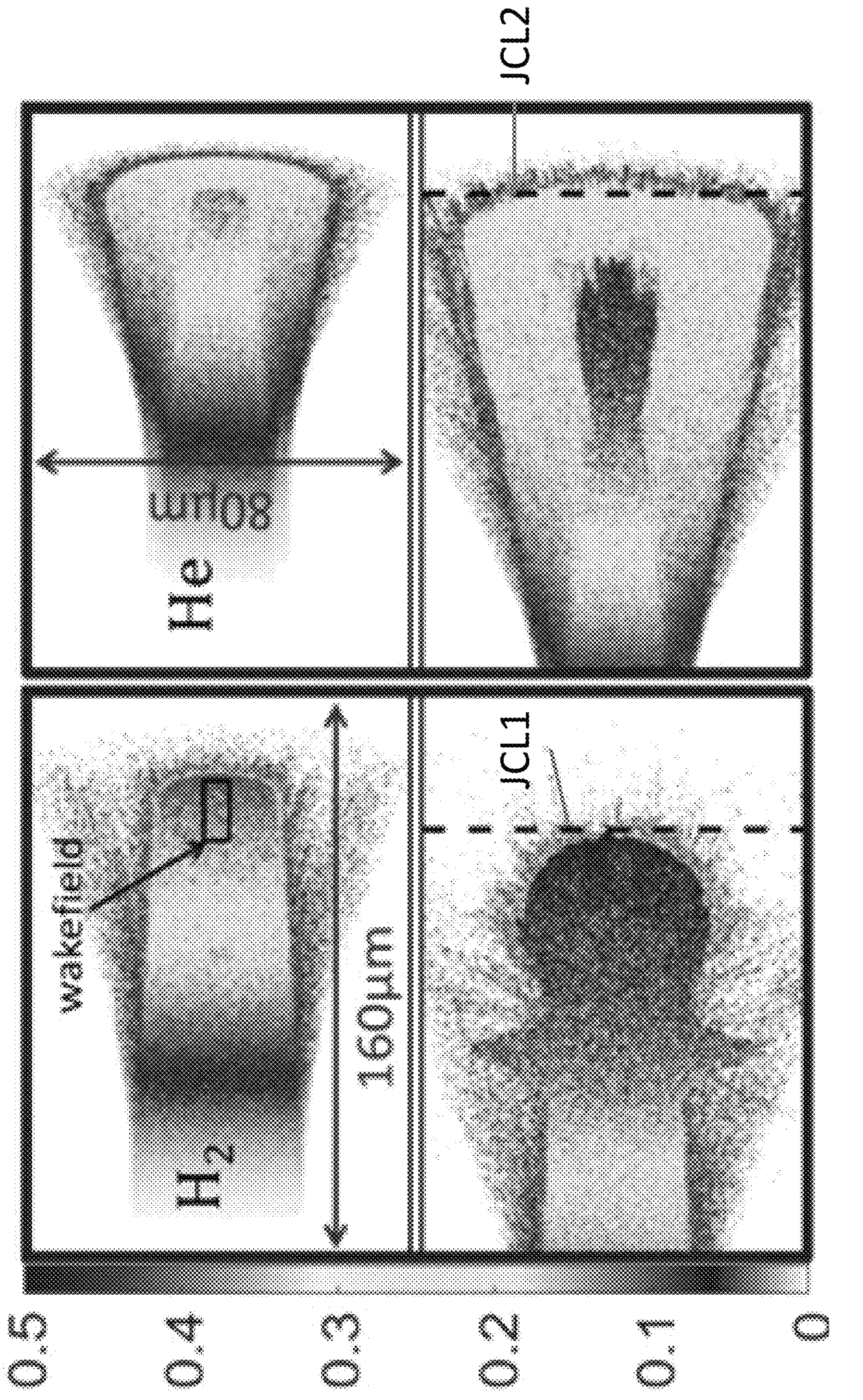
FIG. 2D1
FIG. 2D2
FIG. 2D3
FIG. 2D4

FIG. 3.2
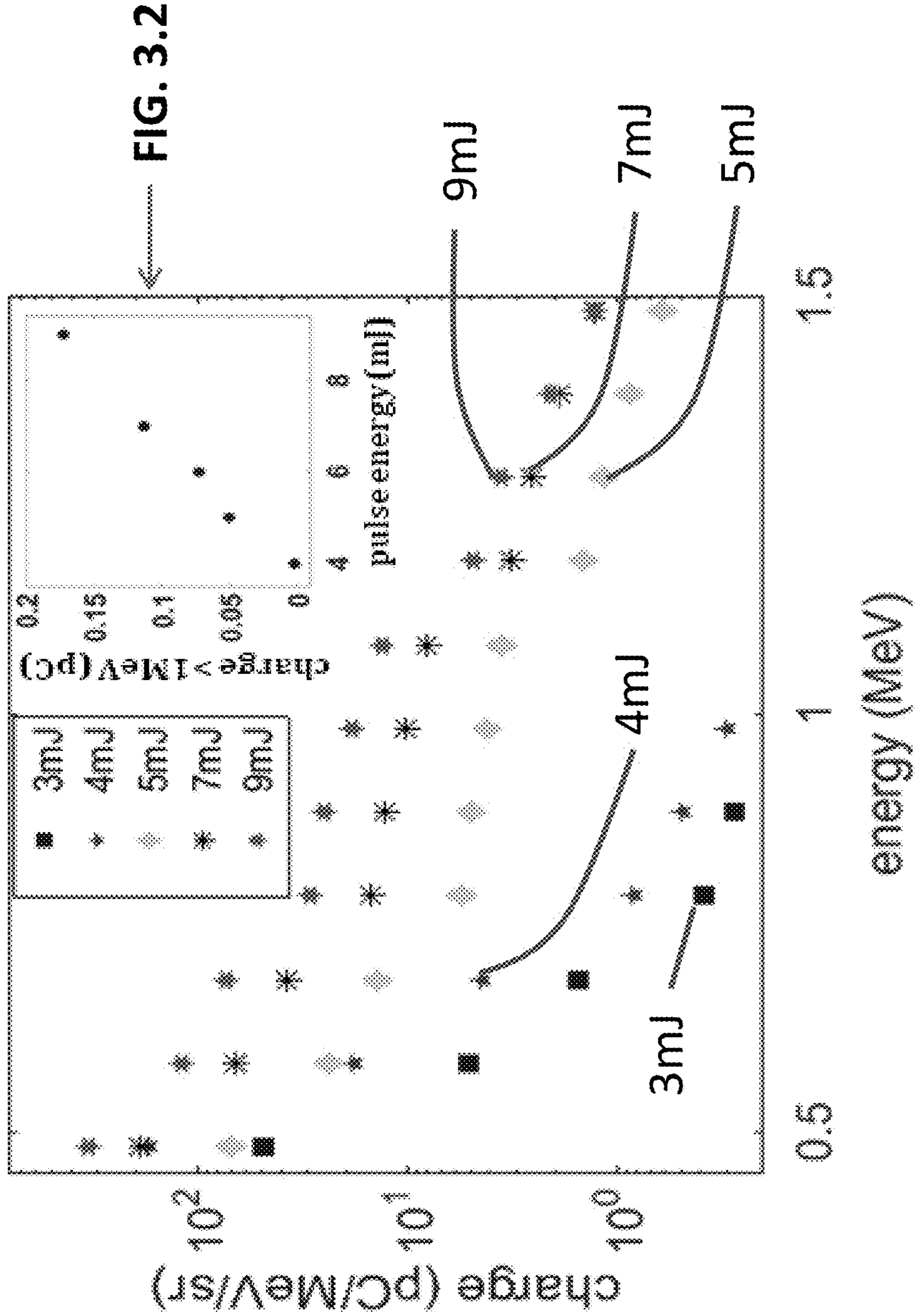
FIG. 3.1

FIG. 4.1
FIG. 4.2
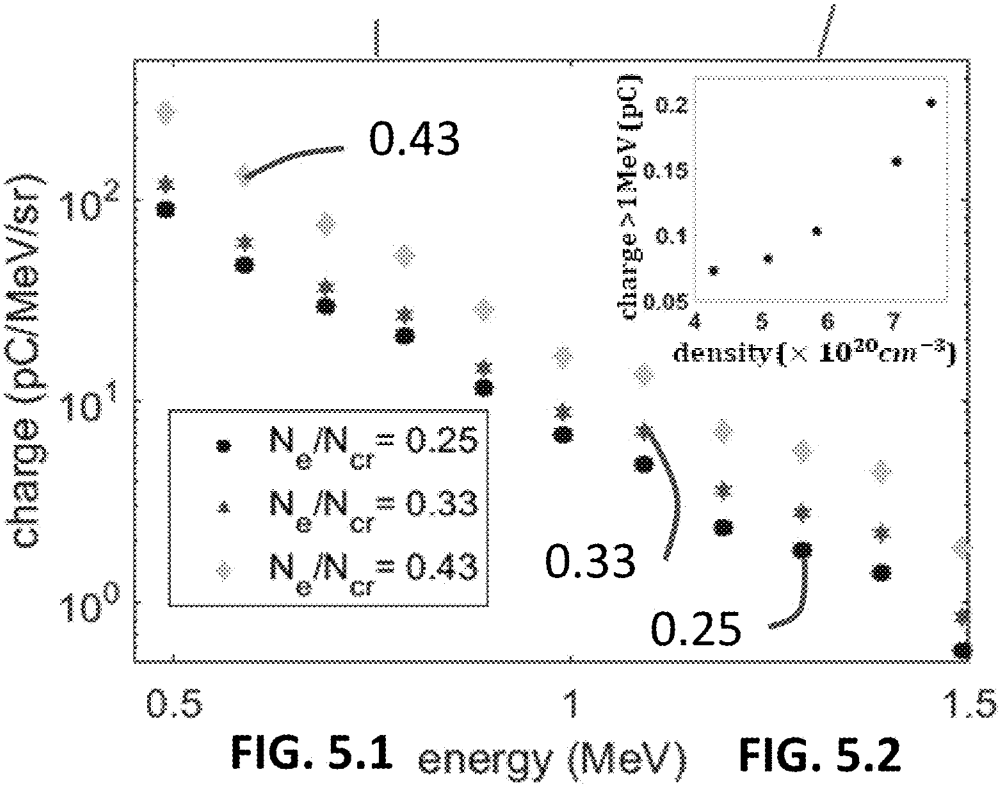
FIG. 5.1
FIG. 5.2
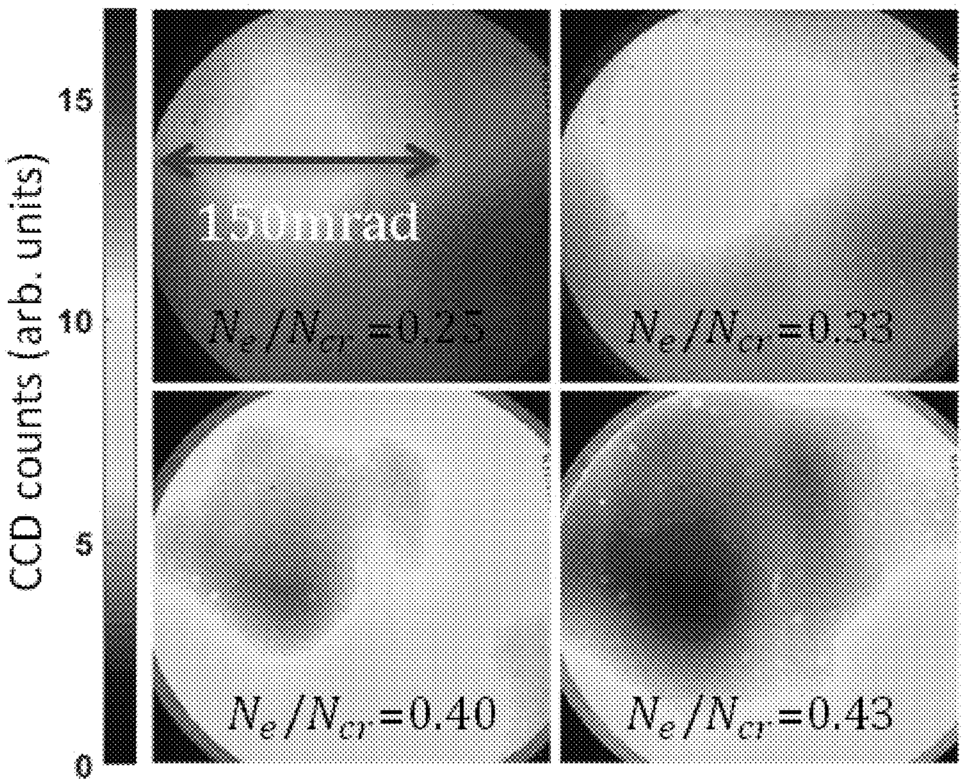
FIG. 5.3
FIG. 5.4

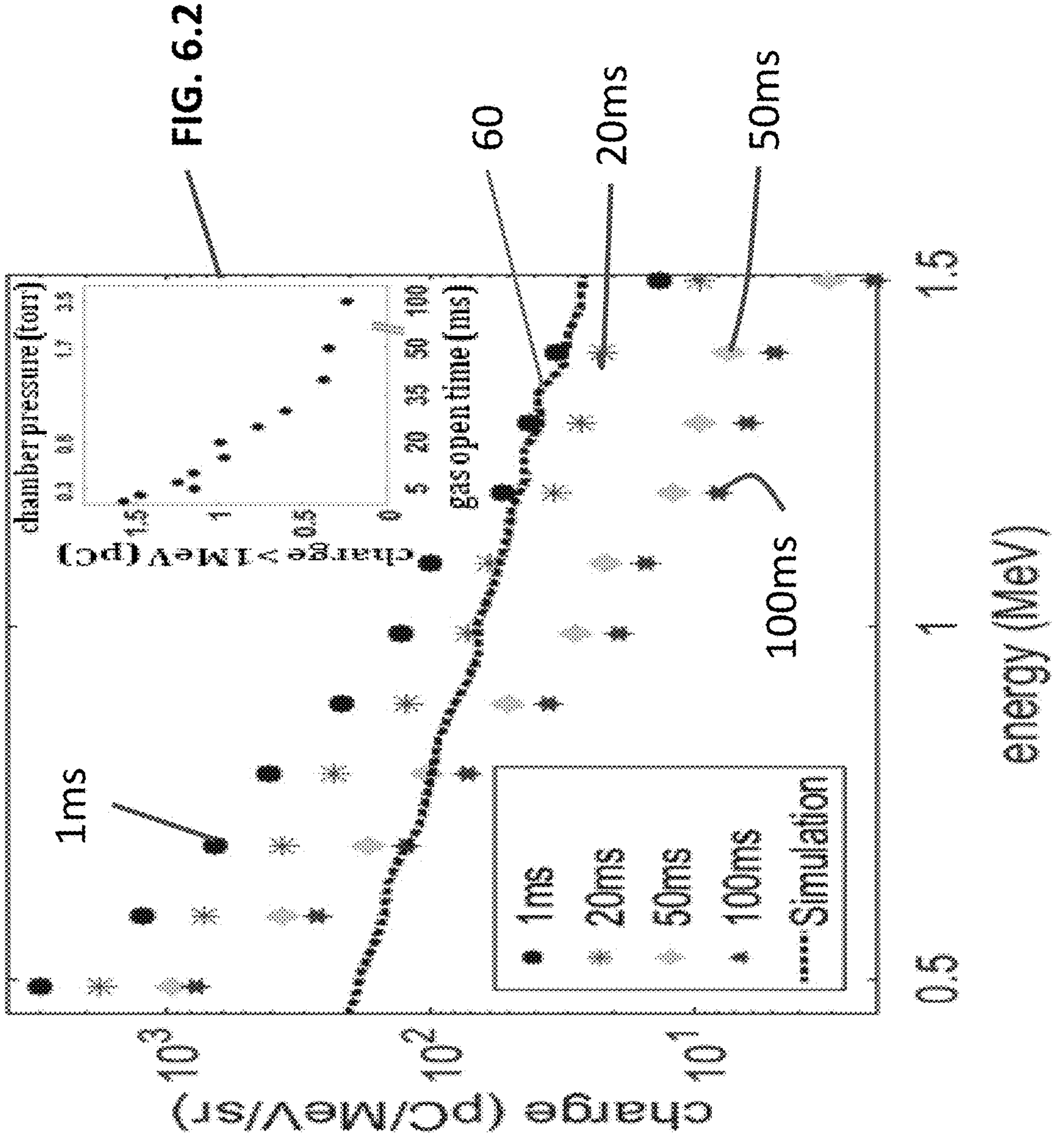
FIG. 6.2
FIG. 6.1

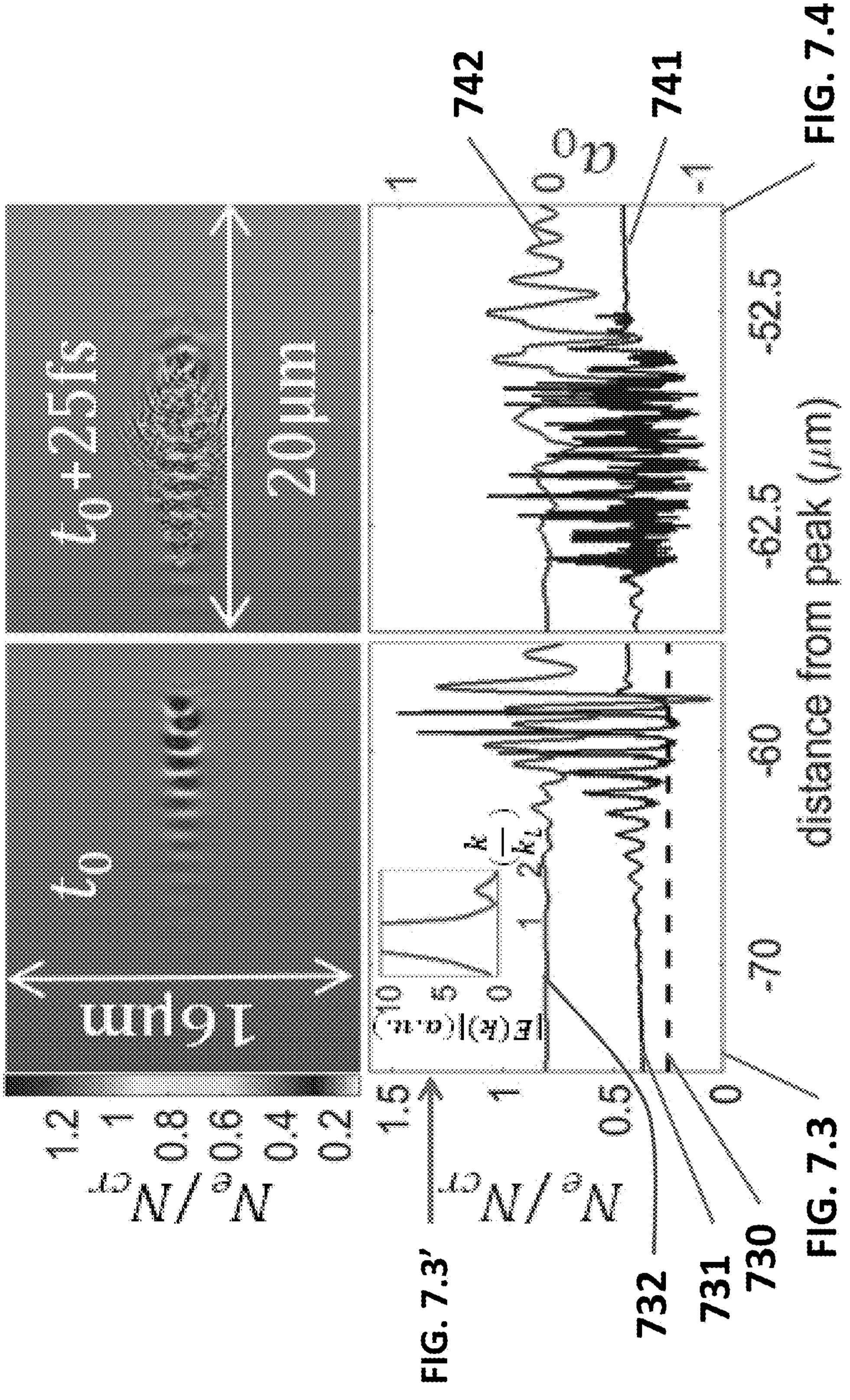
FIG. 7.1
FIG. 7.2
FIG. 7.3'
FIG. 7.3
FIG. 7.4

LASER-DRIVEN HIGH REPETITION RATE SOURCE OF ULTRASHORT RELATIVISTIC ELECTRON BUNCHES

CROSS-REFERENCE TO RELATED APPLICATIONS

This application claims the benefit of, and priority to, U.S. Provisional Patent Application No. 62/336,068, filed on May 13, 2016, entitled "LASER-DRIVEN HIGH REPETITION RATE SOURCE OF ULTRASHORT RELATIVISTIC ELECTRON BUNCHES", by Howard M. Milchberg et al., the entire contents of which are incorporated by reference herein.

STATEMENT OF GOVERNMENT SUPPORT

This invention was made with U.S. government support under FA95501310044 awarded by AFOSR; DESC0007970 awarded by DOE; HDTRA11010045 awarded by DTRA; and PHY1301948 awarded by NSF. The U.S. government has certain rights in the invention.

BACKGROUND

1. Technical Field

The present disclosure relates to laser-driven acceleration systems and more particularly to laser-driven plasma wave electron acceleration systems.

2. Discussion of Related Art

Laser-driven electron acceleration in plasma has become a well-established field since it was proposed several decades ago [1]. In recent years, significant experimental successes have been achieved, including the acceleration of quasi-monoenergetic electron bunches to ~4 GeV [2] and the generation of MeV-range gamma rays [3]. Typically, these experiments demand laser pulse energies of at least several joules, and consequently existing laser technology limits them to low repetition rates (≤10 Hz).

There are numerous applications for MeV-scale electron beams where a compact and portable high repetition rate source is beneficial, especially for potential scanning purposes and improved data collection statistics. At the low pulse repetition rates of ≤10 Hz, radiography using broadband, moderately divergent laser-plasma-accelerated electron beams from gas jets [4,5], or γ-rays from bremsstrahlung conversion of the beam [6,7] has been demonstrated. Prior work at 0.5 kHz using a continuous flow gas jet has produced ~100 keV, 10 fC electron bunches [8] and demonstrated their application to electron diffraction experiments [9]. While high repetition rate acceleration of ~pC electron bunches to MeV-scale using solid and liquid targets has been reported [10,11], gas jet-based laser-plasma electron sources had yet to simultaneously achieve high repetition rate and MeV-scale energies.

In non-plasma based work, time-resolved electron diffraction using laser-driven photocathodes and conventional MeV accelerator structures such as LINACs is an established research area [12], where low emittance and narrow energy spreads are achieved. For <100 fs temporal resolution, that technique requires compensation for space charge effects and timing jitter [12].

The most common and successful laser-plasma-based acceleration scheme is laser wakefield acceleration (LWFA), which can be initiated by relativistic self-focusing of the laser pulse in the plasma. LWFA electron pulses can be ultrashort and are precisely timed to their driving pulses [13]. Relativistic self-focusing has a critical power [14] of $P_{cr}=17.4(N_{cr}/N_e)$ GW, where $N_e$ is the plasma density and $N_{cr}$ is the critical density. As $N_{cr}=1.74\times10^{21}$ cm$^{-3}$ for the Ti:Sapphire laser wavelength of λ=800 nm, a very high $N_e$ is needed to keep $P_{cr}$ well below 1 TW and enable operation with current commercial laser technology for millijoule-scale pulses at 1 kHz.

SUMMARY

To address the foregoing disadvantages of the prior art, the present disclosure relates to laser-driven plasma acceleration of electrons to MeV-scale energies at 1 kHz repetition rate using pulses of less than 10 mJ focused on critical density range He and $H_2$ gas jets. Using the $H_2$ gas jet, electron acceleration to ~0.5 MeV in ~10 fC bunches are possible with laser pulse energy as low as 1.3 mJ. Increasing the pulse energy to 10 mJ, ~1 pC charge bunches with greater than 1 MeV energy are possible for both He and $H_2$ gas jets.

More particularly, the present disclosure relates to a laser-plasma-based acceleration system, that includes a focusing element, a laser pulse emission source that is configured and disposed to direct a laser beam to the focusing element to enable emission of a laser beam such that the laser pulses transform into a focused beam defining a longitudinal center line axis, and a chamber defining a nozzle having a throat and an exit orifice. The nozzle is configured and disposed to enable emission of a critical density range gas jet from the exit orifice of the nozzle, for laser wavelengths ranging from ultraviolet to the mid-infrared.

The critical density range gas jet exits the exit orifice of the nozzle and defines a longitudinal center line axis that intersects the longitudinal center line axis of the focused beam at an angle, wherein the focused beam intersects the critical density range gas jet in proximity to the exit orifice of the nozzle to define a point of intersection between the focused beam and the critical density range gas jet. In intersection with the critical density range gas jet. the pulsed focused beam drives a laser plasma wakefield relativistic electron beam In an embodiment, the critical density range is an electron density $N_e$ that is defined to be 0.1 $N_{cr}<N_e<3N_{cr}$, where the critical density is $N_{cr}=1.12\times10^{21}\lambda^{-2}$ (cm$^{-3}$), where λ is the laser wavelength in microns (μm). For example, for λ=0.8 μm, $N_{cr}=1.74\times^{21}$ cm$^{-3}$.

In an embodiment, critical density range gas jet 1160 generates electron densities $N_e$, upon laser interaction, in the approximate range 0.1 $N_{cr}$ to $3N_{cr}$.

In an embodiment, for a laser wavelength of λ=0.8 μm of the focused beam, the critical density range includes $2\times10^{20}$ cm$^{-3}$ to $5\times10^{21}$ cm$^{-3}$.

In an embodiment, the critical density range of the critical density range gas jet is formed by cryogenic cooling of a gas source, e.g., jet gas source, in fluid communication with the chamber defining the nozzle.

In an embodiment, the laser wavelengths ranging from ultraviolet to mid-infrared include wavelengths ranging from 0.3 μm to 2 μm.

In an embodiment, the laser pulses are at an energy level up to and including 20 mJ.

The present disclosure relates also to a method of laser-plasma-based acceleration that includes directing a laser beam to a focusing element to enable emission of a laser beam such that the laser pulses transform into a focused beam, defining a longitudinal center line axis, emitting a critical density range gas jet from the exit orifice of the nozzle, for laser wavelengths ranging from ultraviolet to mid-infrared. and causing the focused beam to intersect the critical density range gas jet in proximity to the exit orifice of the nozzle to define a point of intersection between the focused beam and the critical density range gas jet, wherein in intersection with the critical density range gas jet the pulsed focused beam drives a laser plasma wakefield relativistic electron beam.

In an embodiment, the emitting a critical density range gas may be emitting a critical density range gas at a critical electron density that is defined to be 0.1 $N_{cr}<N_e<3N_{cr}$, where the critical density is $N_{cr}=1.12\times10^{21}\lambda^{-2}$ ($cm^{-3}$), where λ is the laser wavelength in microns. For example, for $\lambda=0.8$ μm, $N_{cr}=1.74\times^{21}$ $cm^{-3}$).

In an embodiment, the critical density range gas jet may generate electron densities $N_e$, upon laser interaction, in the approximate range 0.1 $N_{cr}$ to $3N_{cr}$.

Similarly, in an embodiment, for a laser wavelength of $\lambda=0.8$ μm of the focused beam, the critical density range includes $2\times10^{20}$ $cm^{-3}$ to $5\times10^{21}$ $cm^{-3}$.

In an embodiment, the method may include the critical density range of the critical density range gas jet being formed by cryogenic cooling of a gas source in fluid communication with the chamber defining the nozzle.

Similarly, In an embodiment, the laser wavelengths may range ultraviolet to mid-infrared to include wavelengths ranging from 0.3 μm to 2 μm.

In an embodiment, the method may include wherein the laser pulses are at an energy level up to and including 20 mJ.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned advantages and other advantages will become more apparent from the following detailed description of the various exemplary embodiments of the present disclosure with reference to the drawings wherein:

FIG. 1A' is a reproduction of FIG. 1A positioned and labeled to indicate relationships between FIG. 1A and subsequent FIGS. 1A1, 1A2, 1A3, 1A4 and 1A5;

FIG. 1A1 is an interferometrically-derived image of a hydrogen jet density profile utilized to form the plasma-based acceleration system;

FIG. 1A2 is a graphical plot of forward scattered laser spectrum (in nanometers (nm)) as measured by a spectrometer wherein the spectrum shows that relativistic self-focusing has occurred in the dense jet plasma;

FIG. 1A3 illustrates a side-by-side comparison of quasi-monoenergetic (left side) versus exponential spectra (right side) in MeV for a 40 mJ pulse at $N_e=2\times10^{20}$ $cm^{-3}$;

FIG. 1A4 is a shadowgraphic imaging of the laser interaction region above the needle orifice utilized to form the plasma-based acceleration system; the superimposed bright flash is wavebreaking radiation;

FIG. 1A5 is a spectrum plot of the wavebreaking radiation flash in intensity versus wavelength in nm;

FIG. 2B1 shows the measured spectrum for an electron beam from 20 consecutive shots at 1 kHz with 9.5 mJ pulse energy of a helium gas jet;

FIG. 2B2 shows the measured density profile of the helium gas jet used in the spectrum of FIG. 2B1;

FIG. 2B3 is the electron beam profile from 20 consecutive shots corresponding to the conditions of FIG. 2B1 and FIG. 2B2;

FIG. 2C1 is an interferogram showing residual gas plasma 1 picosecond after interaction of a 5 mJ laser pulse with a hydrogen gas jet;

FIG. 2C2 is an interferogram showing residual gas plasma 1 picosecond after interaction of a 5 mJ laser pulse with a helium gas jet;

FIG. 2D1 is an electron density profile before wavebreaking from a 2-dimensional particle-in-cell simulation of interaction of a 5 mJ, 30 femtosecond (fs) with 200 micron (μm) full-width-at-half-maximum hydrogen jet;

FIG. 2D2 is an electron density profile after wavebreaking from the 2-dimensional particle-in-cell simulation of interaction of the 5 mJ, 30 femtosecond (fs) with 200 micron (μm) full-width-at-half-maximum hydrogen jet of FIG. 2D1 250 fs after wavebreaking;

FIG. 2D3 is an electron density profile before wavebreaking from a 2-dimensional particle-in-cell simulation of interaction of a 5 mJ, 30 femtosecond (fs) with 200 micron (μm) full-width-at-half-maximum helium jet;

FIG. 2D4 is an electron density profile after wavebreaking from the 2-dimensional particle-in-cell simulation of interaction of the 5 mJ, 30 femtosecond (fs) with 200 micron (μm) full-width-at-half-maximum helium jet of FIG. 2D3 250 fs after wavebreaking;

FIG. 3.1 illustrates accelerated electron energy spectra from an $H_2$ jet for varying laser pulse energy and 10 ms gas jet open time;

FIG. 3.2 illustrates total accelerated charge from an $H_2$ jet, with >1 MeV energy in picocoulombs vs laser pulse energy in mJ;

FIG. 4.1 illustrates the electron energy spectrum for varying plasma density from a He jet using 9.5 mJ laser pulses and 20 ms gas jet open time;

FIG. 4.2 illustrates total charge per shot with >1 MeV energy vs peak plasma density;

FIG. 5.1 illustrates electron beam profile on LANEX™ screen for plasma density $0.25N_{cr}$, (using He jet);

FIG. 5.2 illustrates electron beam profile on LANEX™ screen for plasma density $0.33N_{cr}$;

FIG. 5.3 illustrates electron beam profile on LANEX™ screen for plasma density $0.40N_{cr}$;

FIG. 5.4 illustrates electron beam profile on LANEX™ screen for plasma density $0.43N_{cr}$;

FIG. 6.1 illustrates electron energy spectrum per shot from He gas jet ($N_e/N_{cr}=0.54$) for different valve open times for 10 mJ laser pulses at 1 kHz and the spectrum (×0.1) from a 3D PIC simulation of one shot for $N_e/N_{cr}=0.5$ and 10 mJ;

FIG. 6.2 illustrates total charge per shot accelerated to >1 MeV valve open time wherein corresponding background pressure is depicted on top axis;

FIG. 7.1 illustrates a simulated plasma wake just before wavebreaking;

FIG. 7.2 illustrates the simulated plasma wake just after wavebreaking;

FIG. 7.3 the central lineout of density profile (blue) and normalized vector potential (reel) before wavebreaking wherein the horizontal dashed line indicates quarter-critical electron density ($N_e/N_{cr}$=0.25).

FIG. 7.3' illustrates pre-wavebreaking spectrum of the self-modulated laser showing anti-Stokes line, with Stokes line suppressed; and FIG. 7.4 illustrates the central lineout of density profile (blue) and normalized vector potential (red) after wavebreaking.

DETAILED DESCRIPTION

Figure 1:
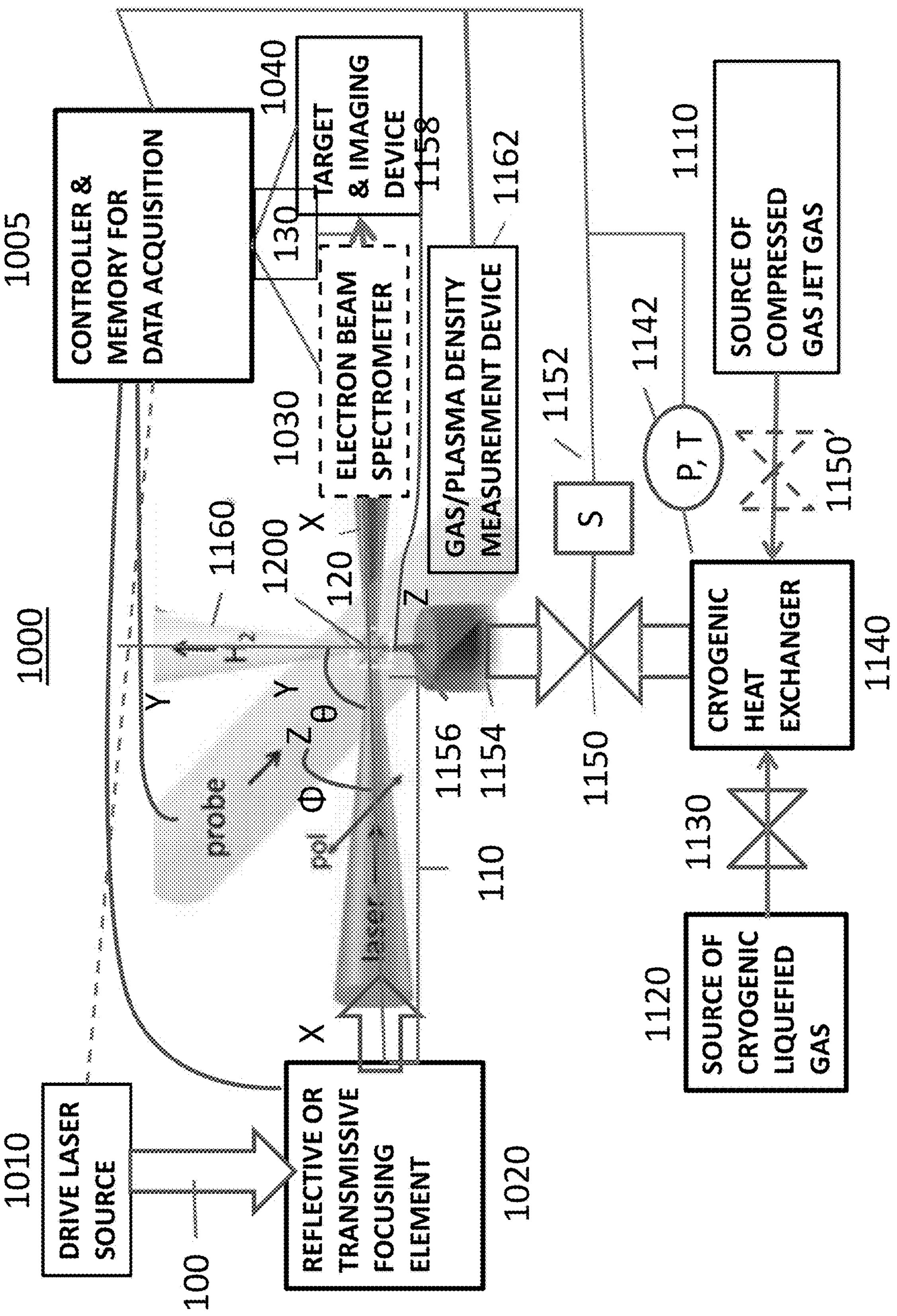
FIG. 1 is a schematic process diagram of a laser-plasma-based acceleration system according to an embodiment of the present disclosure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

Turning now to the particulars of the present disclosure, it is demonstrated that the use of a high density gas jet (at $N_e/N_{cr}$<0.25) lowers $P_{cr}$ sufficiently to promote relativistic self-focusing and laser wakefield acceleration (LWFA) with subterawatt laser pulses [15]. Further, using gas jets approaching even closer to critical density ($N_e/N_{cr}$<0.69) makes possible electron acceleration to relativistic energies with pulse energies as low as 1.3 mJ, enabling use of common 1 kHz laser systems.

Driving laser plasma accelerators at high repetition rate using a gas jet target demands a nearly continuous flow out of a high pressure nozzle, leading to significant accumulated gas loading of the experimental vacuum chamber. This leads to high background chamber pressure, which can enhance the deleterious effects of laser-induced ionization and defocusing well before the pulse encounters the gas jet.

The experiments representing the laser-plasma-based acceleration system according to embodiments of the present disclosure demonstrate electron acceleration at chamber background pressures as high as 20 Torr, enabling use of continuous flow nozzles and even higher repetition rate laser systems for LWFA.

FIG. 1 is a schematic process diagram of a laser-plasma-based acceleration system 1000 according to an embodiment of the present disclosure. More particularly, laser-plasma-based acceleration system 1000 may include a controller and memory for data acquisition 1005. The system 1000 includes a drive laser source 1010 that provides and directs an initial pulsed laser beam 100 to a focusing element 1020, e.g., a reflective focusing element such as an off-axis parabolic mirror or a transmissive focusing element such as a lens. The initial pulsed laser beam 100 is transformed via the focusing element 1020 into a focused pulsed laser beam 110 that is directed to a point of intersection 1200 with a gas jet 1160. Before intersecting with the gas jet, the converging beam may be further reflected from a tilt-adjustable planar minor (not shown) to aid in beam steering. In intersection with the gas jet 1160, the pulsed laser beam 110 drives, in the same direction, a laser plasma wakefield relativistic electron beam 120 that may be directed directly to both a target and an imaging device 1040. The focused pulsed laser beam 110 and the laser plasma wakefield electron beam 120 define a longitudinal axis X-X extending from focusing element 1020 (or the planar minor that is not shown) to the target and the imaging device 1040.

To perform initial calibration and periodic calibration during usage of the laser-plasma-based acceleration system 1000, an electron beam spectrometer 1030 may be positioned periodically to intersect the laser plasma wakefield electron beam 120. Following intersection with electron beam spectrometer 1030, the laser plasma wakefield electron beam 120 now is transformed into laser plasma wakefield electron beam 130 that may be directed to both the target and imaging device 1040.

The gas jet 1160 may be initially formed by a source of compressed gas 1110 that contains the gas being utilized for the laser-plasma-based acceleration system 1000, e.g., hydrogen or helium. The gas emitted from the source of compressed gas 1110 is cooled via a cryogenic heat exchanger 1140 that is supplied by another gas that is cooled to cryogenic temperatures, e.g., liquid nitrogen, and contained within a source of cryogenic liquefied gas 1120, e.g., a pressurized liquid nitrogen dewar, that directs the liquefied gas to the cryogenic heat exchanger 1140 through a valve 1130. Those skilled in the art will recognize and understand that cryogenic cooling of the dense jet gas could also be accomplished via a dedicated cryogenic refrigeration and compression system, not shown.

The now cryogenically cooled jet gas exits from the cryogenic heat exchanger 1140 via flow control valve 1150, having a valve operator 1152, that may be a solenoid operator S, as shown, or other suitable type of operator such as a motor, that is capable of operating within the pulse timing requirements for the system 1000. Pressure and temperature of the jet gas exiting from the cryogenic heat exchanger 1140 may be monitored via one or more sensors 1142, shown for simplicity as a single sensor.

From the flow control valve 1150, the cryogenically cooled jet gas is directed to a chamber 1154 that defines a nozzle 1156 having a throat and exit orifice 1158. The nozzle 1156 is configured to enable emission from the exit orifice 1158 of the jet gas in a critical density range for laser wavelengths ranging from the ultraviolet to the mid-infrared, e.g., 0.3 μm to 2 μm. The exit orifice 1158 is generally set as a 100 μm diameter needle orifice although other diameters may be utilized.

The critical density range gas jet 1160 exiting from the exit orifice 1158 defines a longitudinal centerline axis Y-Y that intersects the longitudinal centerline axis X-X of the focused pulsed laser beam 110 and the laser plasma wakefield electron beam 120 at an angle θ. Thus, the longitudinal centerline axis Y-Y intersects the longitudinal centerline axis X-X orthogonally. Although the angle θ is generally established as 90°, the angle θ may vary without deleterious effects on the intensity of the laser plasma wakefield electron beam 120.

The gas-plasma density at the intersection point 1200 may be probed via a gas-plasma density measurement device 1162 that may be an interferometer. The gas-plasma density measurement device 1162 probes the laser and jet gas intersection point 1200 in a longitudinal centerline axis Z-Z that intersects the jet gas intersection point 1200 thereby also intersecting the centerline axis X-X at an angle Φ. The angle Φ determines the details of the density extraction calculation from the raw probe data.

The controller and memory for data acquisition 1005 communicates with the various components of the system 1000 such as the flow control valve operator 1152 and the gas-plasma density measurement device 1162 to control the repetition rate, density, and gas pulse duration of the gas jet at the intersection point 1200 to match pre-set pulses of pulsed laser beam 110 that originate from the drive laser source 1010. The readings of pressure (P) and temperature (T) sensor 1142 at the exit of the cryogenic heat exchanger 1140 may also be communicated to the controller and memory for data acquisition 1005. Although not generally required since the drive laser source 1010 operation is generally set at constant performance parameters, the controller and memory for data acquisition 1005 may also communicate with and control the drive laser source 1010.

The laser-plasma-based acceleration system 1000 features a thin, high density pulsed gas jet 1160 that reaches a maximum peak molecular density of $9\times10^{20}$ cm$^{-3}$, and when fully ionized can exceed the plasma critical density, $N_{cr}=1.7\times10^{21}$ cm$^{-3}$ at a drive laser 100 wavelength of $\lambda_0$=800 nm from a Titanium-sapphire laser enabled by the drive laser source 1010. The density profile has a full width at half maximum (FWHM) in the range 150-250 μm, depending on the height of the optical axis above the jet orifice.

Pulse focusing is generally controlled via focusing element 1020 such as an f/8.5 off-axis parabolic mirror which can produce, for example, a 9 μm FWHM intensity spot size. Pulse energy can be controlled by a "half-wave plate" (not shown) that is a mirror between the focusing element and the gas jet before compressor gratings (not shown) that are internal to the laser system, thereby enabling energy scans in the range 0.1 mJ to 12 mJ (or greater than 12 mJ up to 20 mJ and may extend to 100 mJ or greater) by rotation of the laser pulse's linear polarization with respect to the grating rulings. To control the duration over which electron beams are generated at high repetition rate (here, 1 kHz), the solenoid-operated flow control valve 1150 or 1150' opening time may be varied from 1 millisecond (ms) to many minutes to control the jet gas flow duration. (Note that positioning the flow control valve at 1150' does not cause the valve to be exposed to cryogenic temperatures and this may be more suitable for high repetition rates up to 1 kHz).

High densities are achieved using a combination of high flow control valve supply pressure at sensor 1142 exiting from the cryogenic heat exchanger 1140 and cryogenic cooling of the gas jet gas passing through the flow control valve 1150, which is forced through the 100 μm diameter needle orifice 1158.

Note that FIG. 1 does not illustrate a vacuum chamber in which certain components are located. Such a vacuum chamber 2002 is shown by a dashed line in FIG. 2A that is discussed below. In FIG. 1, the equipment located outside of the vacuum chamber (not shown) are the controller and memory for data acquisition 1005, the drive laser source 1010, the source of compressed gas jet gas 1110 and the source of cryogenic liquefied gas 1120. The gas/plasma density measurement device 1162 may be located either inside or outside of the vacuum chamber. The target and imaging device 1040 may be located either inside or outside of the vacuum chamber, depending on details. In the experimental setup of FIG. 2A, CCD camera 2050 is located outside of the vacuum chamber and images target and LANEX™ screen 2040 that is internal to the vacuum chamber 2002 and affixed to a transparent vacuum window (not shown) on the side facing the interior of the vacuum chamber 2002.

Figure 1A:
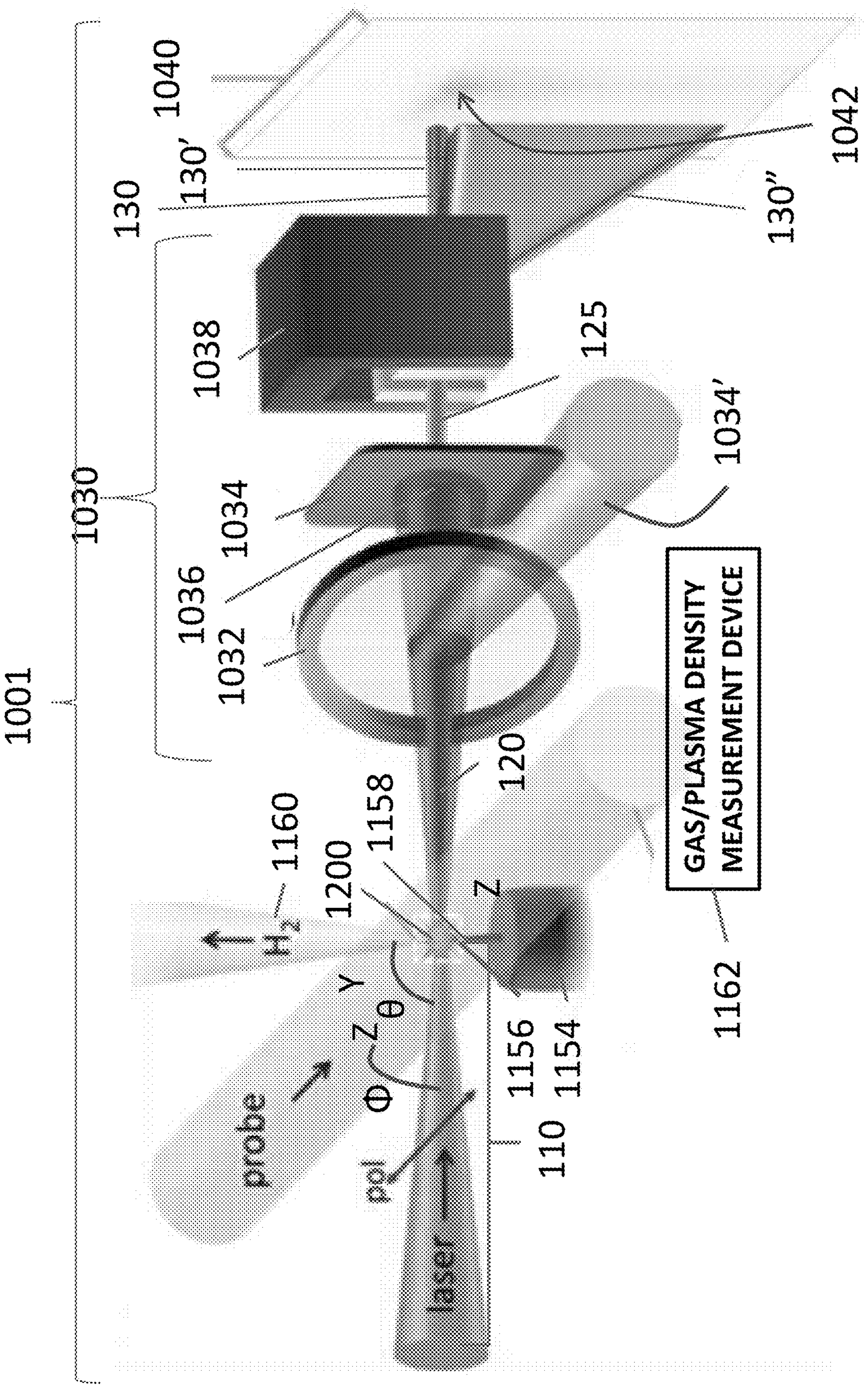
FIG. 1A is a schematic diagram of a detailed portion of the laser-plasma-based acceleration system of FIG. 1.
Figure 1A:
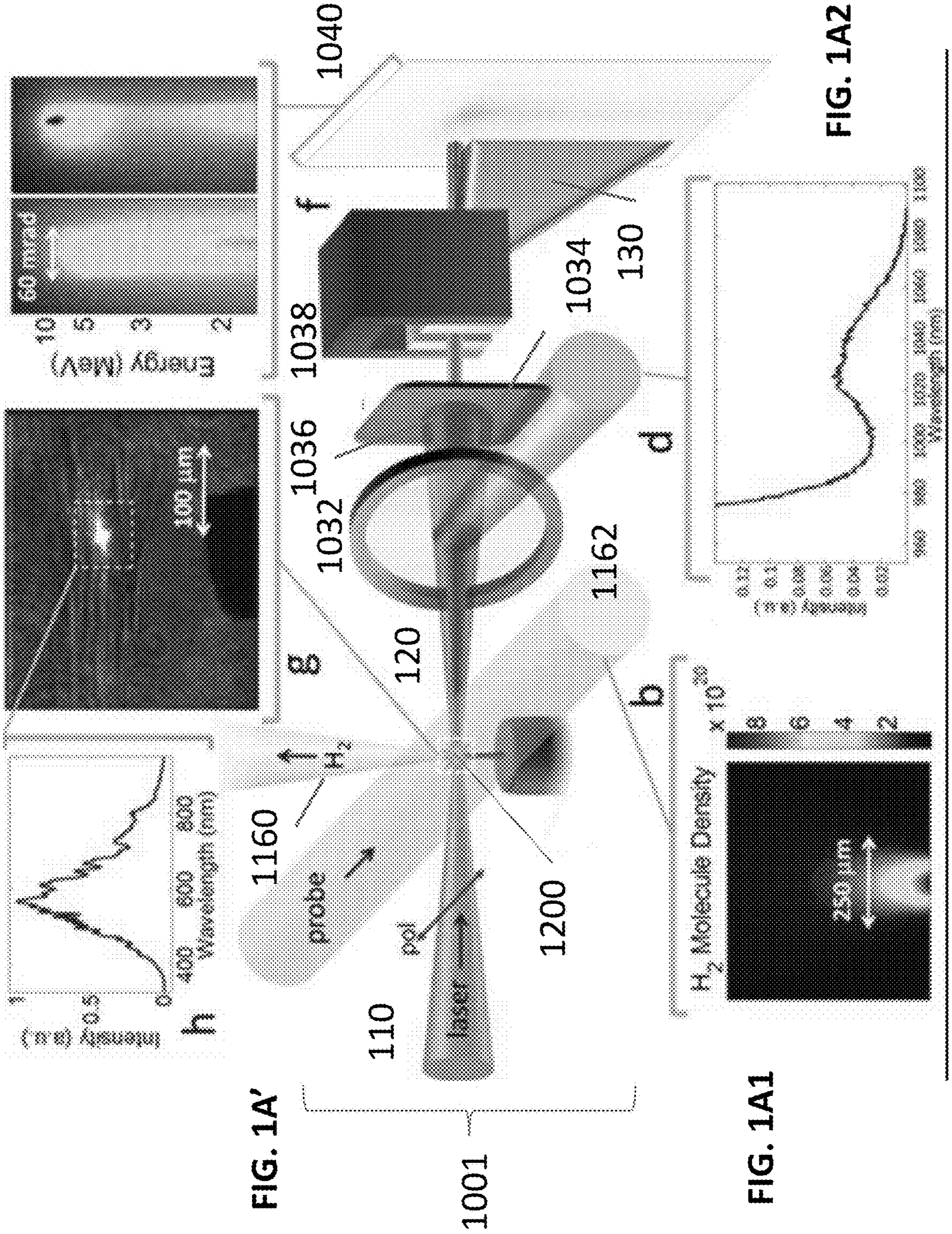

FIG. 1A is a schematic diagram of a detailed portion 1001 of the laser-plasma-based acceleration system 1000 of FIG. 1 that were used to obtain experimental results. Only those portions of the detail that are not explicitly shown in FIG. 1 and described above with respect to FIG. 1 are described herein. More particularly, neutral jet density and plasma profiles were measured using a 400 nm, 70 fs probe pulse as an operating feature of the gas-plasma density measurement device 1162 that is directed perpendicularly through the gas jet 1160 (axis Z-Z of the gas-plasma measurement device 1162 perpendicular to axis Y-Y of the gas jet 1160) to a folded wavefront interferometer that may perform the function of gas/plasma density measurement device 1162. Forward- and side-directed optical spectra were collected by fiber-coupled spectrometers, with the forward spectra directed out of the path of the pump laser and electron beam 120 by a pellicle 1032.

A portion of the transmitted laser pulse 120 is reflected by the pellicle 1032 and measured by a spectrometer 1034' (See FIG. 1A2 described below), and its beam shape can be measured by auxiliary CCD camera. The pellicle 1032 is a very thin transmissive membrane utilized to observe the laser beam mode and spectrum (as in FIG. 1A2).

The electron beam 120 from the jet is apertured by a 1.7 mm horizontal slit 1036 in a copper plate 1034 enters as beam 125 into a permanent magnet spectrometer 1038, (for the experimental conditions herein, the magnet spectrometer had a field strength of 0.13 T, although other field strengths may be utilized) and is dispersed as a beam 130 on an aluminum foil-shielded LANEX™ screen 1040, which is imaged by a low noise CCD camera (not shown in FIG. 1 and shown in FIG. 2A below). The dispersed beam 130 ranges from a high energy portion at 130' to a low energy portion at 130''. The high energy portion 130' arrives near 1042 on the LANEX™ screen 1040.

Shadowgraphic images using the 400 nm probe and images of bright broadband wavebreaking radiation flashes were collected using achromatic optics.

Relativistic electron spectra in the energy range 2-15 MeV were measured using the 0.13 T permanent magnet spectrometer 1038 25 cm downstream of the gas jet (referenced as "f" in FIG. 1A3 below). The copper plate 1034 with a 1.7 mm×12 mm slit aperture 1036 in front of the entrance to magnet 1038 provided energy resolution while allowing measurement of beam divergence in one dimension (1D). Electron spectra were dispersed along a LANEX™ scintillating screen, shielded against exposure to the laser by 100 μm thick aluminum foil, and imaged using a low noise charge-coupled device (CCD) camera. Full electron beam profiles were collected on the LANEX™ screen by translating the dispersing magnets and slit aperture out of the way. Estimates of the accelerated charge were made by calibrating the imaging system and using published LANEX™ conversion efficiencies [14].

Turning now to FIGS. 1A', 1A1, 1A2, 1A3, 1A4 and 1A5, 1A' is a reproduction of FIG. 1A positioned and labeled to indicate relationships between FIG. 1A and subsequent FIGS. 1A1, 1A2, 1A3, 1A4 and 1A5. More particularly, the foregoing figures relate to an experimental setup wherein, referring now to FIG. 1A', horizontally polarized (pol)

pulses 110 from a Ti:Sapphire laser (50 fs, 10-50 mJ) as the drive laser source 1010 in FIG. 1 are focused into the cryogenically cooled gas jet 1160 in FIG. 1 with an f/9.5 off-axis paraboloid as the focusing element 1020 in FIG. 1 to a spot size $w_{FWHM}$=8.4 μm (1.2× the diffraction limit) containing 80% of the pulse energy, with a confocal parameter of 550 μm. For maximizing electron beam charge and energy, it was found that placing the focused beam waist of pulsed beam 110 at the center of the gas jet 1160 to create point of intersection 1200 was optimal, without strong sensitivity to positioning. This is consistent with the laser confocal parameter being more than twice the jet width, and is the reason for designing narrow jet widths. The horizontally polarized (pol) Ti:Sapphire laser pulse (10-50 mJ, 50 fs, λ=800 nm) from drive laser source 1010 interacts with a cryogenically-cooled, dense thin $H_2$ gas jet 1160, whose neutral and plasma density profiles are measured by 400 nm probe interferometry 1162 and plotted in FIG. 1A1 (referenced as “b” in FIG. 1A') which is FIG. 1A1 is an interferometrically-derived image of a hydrogen jet density profile utilized to form the plasma-based acceleration system.

A portion of the transmitted laser pulse 120 is reflected by pellicle 1032 and measured by a spectrometer (not shown) and plotted as “d” in FIG. 1A2 as Intensity (a.u.) versus wavelength in nm. FIG. 1A2 is a graphical plot of forward scattered laser spectrum (in nanometers (nm)) as measured by a spectrometer wherein the spectrum shows that relativistic self-focusing has occurred in the dense jet plasma.

The electron beam 120 from the jet is apertured by the 1.7 mm horizontal slit 1036 in copper plate 1034, enters as beam 125 the 0.13 T permanent magnet spectrometer 1038, and is dispersed as beam 130 on the aluminum foil-shielded LANEX™ screen 1040, which is imaged by the low noise CCD camera (not shown).

FIG. 1A3 (referenced as “f” in FIG. 1A') is a side-by-side comparison of quasi-monoenergetic (left side) versus exponential spectra (right side) in MeV for a 40 mJ pulse at $N_e=2\times10^{20}$ cm$^{-3}$.

FIG. 1A4 is shadowgraphic imaging (referenced as “g” in FIG. 1A') of the laser interaction region 1200 above the needle orifice 1156, 1158 (see FIG. 1A). The needle 1156 is seen as a shadow near the bottom of the figure. The superimposed bright flash is wavebreaking radiation.

FIG. 1A5 is a spectrum plot of spectroscopy (referenced as “h” in FIG. 1A') of the wavebreaking radiation flash in intensity versus wavelength in nm.

It should be noted that polarization “pol” of drive laser beam 110 could also be rotated from the horizontal as shown to the vertical by a half wave plate, or could be any general elliptical polarization.

Figure 1B:
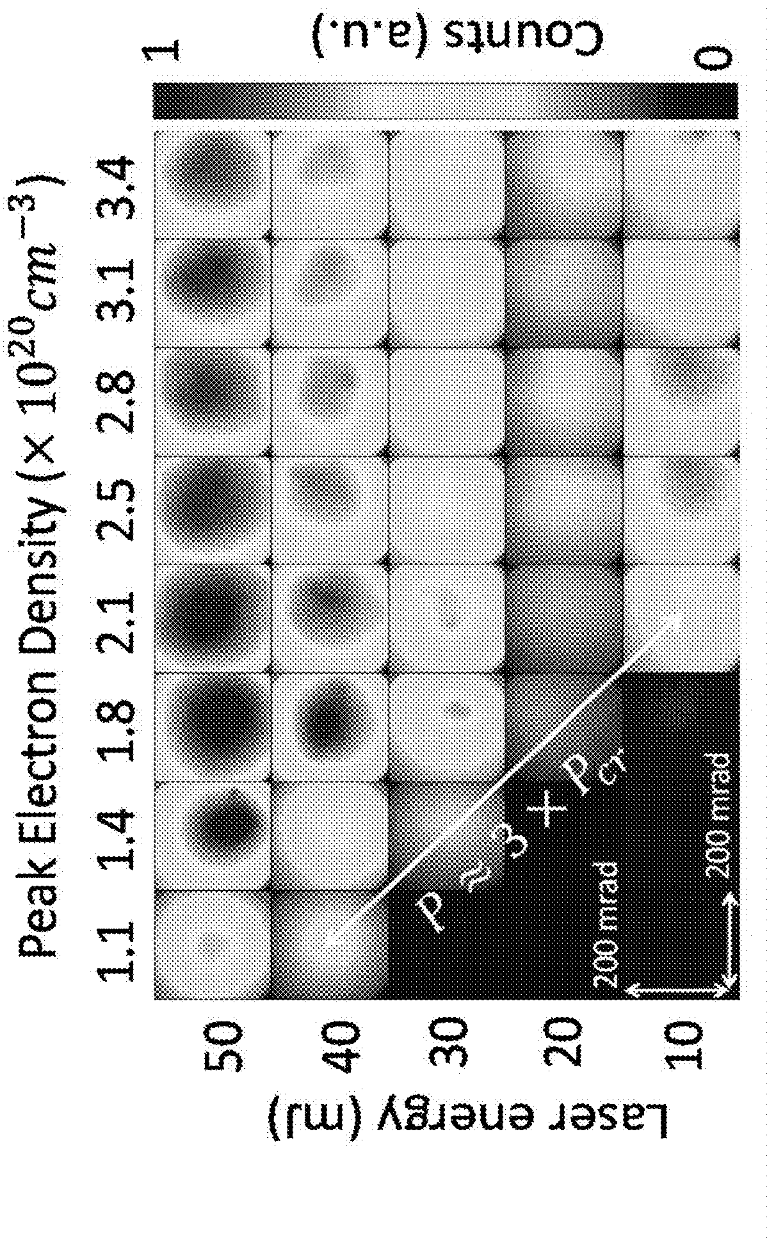
FIG. 1B illustrates single shot-induced electron-beam images for energies greater than 1 MeV for a range of laser energies in mJ versus peak jet electron density ($\times10^{20}$ $cm^{-3}$)

FIG. 1B illustrates single shot-induced electron-beam images for energies greater than 1 MeV for a range of laser energies in mJ versus peak jet electron density (×10$^{20}$ cm$^{-3}$). The color palette was scaled up by 10× for the 10 mJ column. The onset laser power for detectable electron beam generation was ~3 $P_{cr}$ across our range of conditions.

The high density of target 1040 has the immediate effect of enabling relativistic self-focusing of low energy laser pulses leading to the generation of a nonlinear plasma wake. Furthermore, the reduced laser group velocity (and therefore plasma wave phase velocity) at high density drops the threshold for electron injection. FIG. 1B shows >1 MeV electron beam generation for pulse energies in the range 10-50 mJ, or 0.2-1.0 TW, as a function of peak plasma density. Beam divergence is ≲200 mrad. The results are consistent with the inverse density scaling of the relativistic self-focusing critical power, $P_{cr}=17.4(N_{cr}/N_e)$ GW [A2], and the laser power threshold for appearance of a relativistic electron beam is ~3$P_{cr}$ across our range of conditions.

Figure 2A:
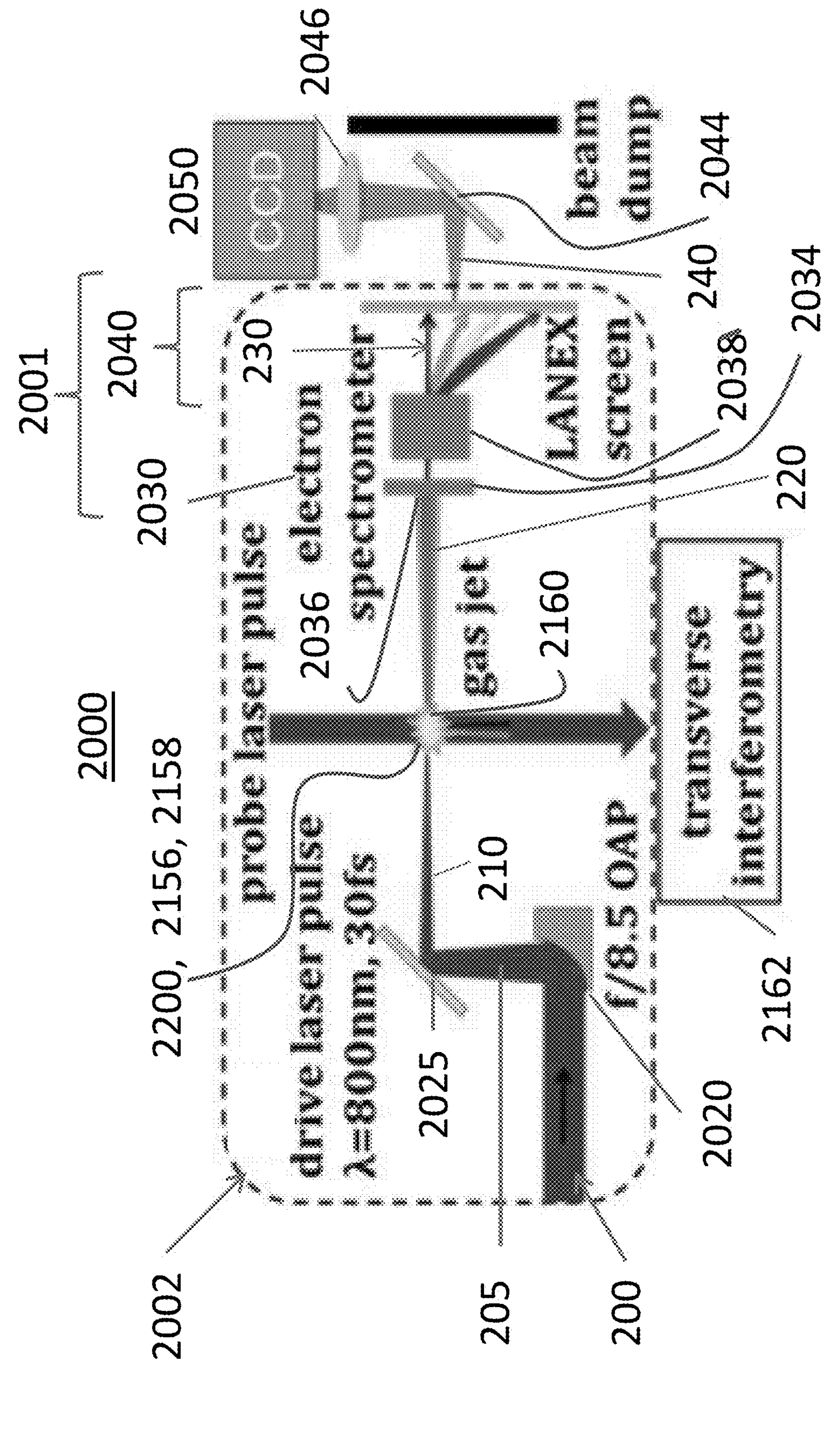
FIG. 2A is another embodiment of schematic process diagram of the laser-plasma-based acceleration system of FIGS. 1 and 1A, wherein the laser-plasma-based acceleration system of FIG. 2A is configured to enable laser pulse energies as low as 10 mJ at repetition rates as high as 1 kHz.

FIG. 2A is another embodiment of schematic process diagram of the laser-plasma-based acceleration system of FIGS. 1 and 1A, wherein the laser-plasma-based acceleration system 2000 of FIG. 2A is configured to enable laser pulse energies as low as 10 mJ at repetition rates as high as 1 kHz. The system 2000 was utilized to obtain experimental results and includes a drive laser (not shown) that is analogous to drive laser 1010 in FIG. 1. The system 2000 may be adapted for commercial applications.

Laser-plasma-based acceleration system 2000 is housed in a vacuum chamber 2002 illustrated by the rounded rectangular dashed line, and may include a controller and memory for data acquisition (not shown) that is analogous to controller and memory for data acquisition 1005 in FIG. 1. The system 2000 also includes a drive laser source (not shown) that is analogous to drive laser source 1010 in FIG. 1 and that provides and directs an initial pulsed laser beam 200 to a focusing element 2020, again analogous to focusing element 1020, e.g., a reflective focusing element such as an off-axis parabolic mirror or a transmissive focusing element such as a lens. The initial pulsed laser beam 200 is transformed via the focusing element 2020 into a focused pulsed laser beam 205 that is directed to a planar mirror 2025 and reflected and focused as a focused beam 210 directed to a point of intersection 2200 with a gas jet 2160 (rising vertically from the plane of the paper). In the interaction with the gas jet 2160, the pulsed laser beam 210 drives a laser plasma wakefield beam 220 of relativistic electrons and that may be directed directly to both a target and an imaging device 1040. The focused pulsed laser beam 210 and the laser plasma wakefield electron beam 220 define a longitudinal axis (not shown) that is analogous to longitudinal axis X-X in FIG. 1 and which extends from planar mirror 2025 to target and the imaging device 2040.

Similarly, to perform initial calibration and periodic calibration during usage of the laser-plasma-based acceleration system 2000, an electron beam spectrometer 2030 may be positioned to intersect the laser plasma wakefield electron beam 220. Following intersection with electron beam spectrometer 2030, the laser plasma wakefield electron beam 220 now is transformed into laser plasma wakefield electron beam 230 that may be directed directly to both the target and imaging device 2040.

The gas jet 2160 may be initially formed by a source of compressed gas and a source of cryogenic liquefied gas both supplying a cryogenic heat exchanger as described above with respect to FIG. 1, or via a dedicated cryogenic refrigeration and compression system, and is not further described here. In a similar manner as with respect to FIG. 1 described above, the gas jet exits a nozzle 2156 having a throat and exit orifice 2158.

From a flow control valve (not shown) analogous to flow control valve 1150, the cryogenically cooled jet gas is directed to a chamber analogous to chamber 1154 and that defines the nozzle 2156 having throat and exit orifice 2158. In an analogous manner, the nozzle 2156 is configured to enable emission of, or gas flow, from the exit orifice 2158 of the jet gas in a critical density range for laser wavelengths ranging from the visible to the infrared, e.g., 0.3 μm to 2 μm. The exit orifice 2158 is generally set as a 100 μm diameter needle orifice, The critical density range gas jet 2160 exiting from the exit orifice 2158 similarly defines a longitudinal centerline axis analogous to axis Y-Y that intersects the longitudinal centerline axis analogous to axis X-X of the focused pulsed laser beam 110, now 210, and analogous to the laser plasma wakefield electron beam 120 at an angle θ, now the laser plasma wakefield electron beam 220. Thus, the longitudinal centerline axis Y-Y intersects the longitudinal centerline axis X-X orthogonally. Although the angle θ is generally established as 90°, the angle θ may vary without deleterious effects on the intensity of the laser plasma wakefield electron beam 120.

The gas-plasma density at the intersection point 2200 is probed via a gas-plasma density measurement device 2162, illustrated as transverse interferometry. The gas-plasma density measurement device 2162 probes the laser and jet gas intersection point 2200 in a longitudinal centerline axis, analogous to axis Z-Z, that intersects the jet gas intersection point 2200 thereby also intersecting the centerline axis, analogous to axis X-X at an angle Φ. Again, the angle Φ. may vary from 90° without deleterious effects. A controller and memory for data acquisition (not shown), that is analogous to controller and memory for data acquisition 1005, communicates with the various components of the system 2000 such as a flow control valve operator analogous to the flow control valve operator 1152 and with the gas-plasma density measurement device 2162 to control the repetition rate and density of the gas jet and plasma formed at the intersection point 2200 to match pre-set pulses of pulsed laser beam 210 that originate from the drive laser source that is analogous to drive laser source 2010. The readings of a pressure and temperature sensor analogous to pressure and temperature sensor 1142 at the exit of the cryogenic heat exchanger 1140 may also be communicated to the controller and memory for data acquisition. Again, although not generally required since the drive laser source 2010 operation is generally set at constant performance parameters, the controller and memory for data acquisition may also communicate with and control the drive laser source.

Analogously to the detailed portion 1001 of the laser-plasma-based acceleration system 1000 of FIG. 1A, laser-plasma-based acceleration system 2000 also includes a detailed portion 2001 that is described herein that was used to obtain experimental results.

Gas jet density and plasma profiles were measured using folded wavefront interferometry, e.g., transverse interferometry 2162 [17] with a λ=800 nm probe split from the main pulse. High density $H_2$ and He gas jets were produced by cooling the gas to −150 C while pressurized up to 1100 psi, and flowing the gas through the 150 μm internal diameter nozzle 2156, 2158 into vacuum chamber 2002 pumped by a 220CFM roots blower. (Other nozzle internal diameters could be selected). The gas jet density encountered by the laser pulse was controlled by changing the jet gas supply pressure, temperature, and the location of the laser focus on the jet at the intersection point 2200. As determined from interferometry, the jet density has a Gaussian transverse profile of FWHM 150-250 μm depending on laser focus position with respect to the nozzle orifice 2158. Within ~60 μm of the nozzle exit, $N_e/N_{cr}$~1 was achieved at full ionization. Accelerated electron spectra were collected 35 cm beyond the jet by a magnetic spectrometer 2038 consisting of a compact permanent 0.08 T magnet located behind a 1.7 mm wide copper slit 2036 in a copper plate 2034, followed by a LANEX™ scintillating screen 2040 imaged as signal 240 onto low noise CCD camera 2050 via a reflecting or turning mirror 2044 and lens 2046. The LANEXT™ screen 2040 was shielded from laser light by 25 μm thick aluminum foil. Accelerated electron beam profiles were collected by moving the slit 2034, 2036 and magnet 2038 out of the way. A lead brick electron beam dump 2060 was placed behind the LANEX™ screen 2040 and turning mirror 2044.

FIG. 2B1 shows the measured spectrum for an electron beam from 20 consecutive shots at 1 kHz with 9.5 mJ pulse energy of a helium gas jet;

FIG. 2B2 the measured density profile of the helium gas jet used in the spectrum of FIG. 2B1.

FIG. 2B3 is the electron beam profile from the 20 consecutive shots corresponding to the conditions of FIG. 2B1 and FIG. 2B2.

The sharp left-right edges on the spectrum are from electron beam clipping on the spectrometer magnet, and the lower energy section is focused by the magnet's fringe fields.

FIG. 2C1 is an interferogram showing residual gas plasma 1 picosecond after interaction of a 5 mJ laser pulse with a hydrogen gas jet.

FIG. 2C2 is an interferogram showing residual gas plasma 1 picosecond after interaction of a 5 mJ laser pulse with a helium gas jet.

In both cases, the dark shadow is the gas nozzle.

FIG. 2D1 is an electron density profile before wavebreaking from a 2-dimensional particle-in-cell simulation of interaction of a 5 mJ, 30 femtosecond (fs) with 200 micron (μm) full-width-at-half-maximum hydrogen jet.

FIG. 2D2 is an electron density profile after wavebreaking from the 2-dimensional particle-in-cell simulation of interaction of the 5 mJ, 30 femtosecond (fs) with 200 micron (μm) full-width-at-half-maximum hydrogen jet of FIG. 2D1 250 fs after wavebreaking.

FIG. 2D3 is an electron density profile before wavebreaking from a 2-dimensional particle-in-cell simulation of interaction of a 5 mJ, 30 femtosecond (fs) with 200 micron (μm) full-width-at-half-maximum helium jet FIG. 2D4 is an electron density profile after wavebreaking from the 2-dimensional particle-in-cell simulation of interaction of the 5 mJ, 30 femtosecond (fs) with 200 micron (μm) full-width-at-half-maximum helium jet of FIG. 2D3 250 fs after wavebreaking.

In FIGS. 2D2 and 2D4, the dashed lines JCL1 and JCL2, respectively, each represent the centerline of the gas jets.

FIG. 3.1 illustrates accelerated electron energy spectra from $H_2$ jets for varying laser pulse energy and 10 ms gas jet open time for 3 mJ, 4 mJ, 5 mJ, 7 mJ and 9 mJ pulse energies.

FIG. 3.2 illustrates total accelerated charge from an $H_2$ jet with >1 MeV energy in picocoulombs vs. laser pulse energy in mJ. The ±0.05 MeV energy bins correspond to the magnetic spectrometer's coarsest energy resolution (at 1.5 MeV).

Each individual point in FIG. 3.1 is the average of 10 consecutive shots. The exponential electron spectra of FIG. 3.1 and the moderately collimated beams of FIG. 2B3 are evidence of self-modulated laser wakefield acceleration (SM-LWFA), reflecting acceleration from strongly curved plasma wave buckets and wavebreaking electron injection into a range of accelerating phases [15]. Lowering the laser pulse energy requires increasing the electron density (via the jet gas density) to maintain $P>P_{cr}$. The minimum electron density required to observe electron acceleration with 9 mJ pulses was $4.0\times10^{20}$ $cm^{-3}$ ($N_e/N_{cr}$=0.23). To observe acceleration for 1.3 mJ pulses, it was necessary to increase the electron density to $1.2\times10^{21}$ $cm^{-3}$ ($N_e/N_{cr}$=0.69).

At low laser pulse energies (<3 mJ) with $H_2$ jets, most of the electrons are at energies below the range of the spectrometer and are excessively deflected by the magnet. Moving the spectrometer out of the electron beam path allows the full beam to impact the LANEX™ (shielded by 25 μm aluminum foil) (see FIG. 1A target and imaging 1040). Using the electron transmission data for aluminum [18] and the LANEX™ response [19,20], we estimate electron bunches of ~10 fC charge with up to ~0.5 MeV energy for laser pulse energies as low as 1.3 mJ.

For He jets no electron beams were detected for laser pulses <5 mJ. For both $H_2$ and He jets, increasing the pulse energy to ~10 mJ increased the bunch charge with >1 MeV energy to ~1 pC.

These observations are attributed to ionization-induced defocusing in He at low laser pulse energy. The transverse electron density profile in the $H_2$ jet is flatter than in the He jet owing to lower threshold for full ionization in $H_2$ [21], resulting in less defocusing in $H_2$ and larger amplitude plasma waves This is borne out by interferograms (FIGS. 2C! and 2C2) showing the residual plasma ~1 ps after interaction of a 5 mJ pulse with the He and $H_2$ jets. The associated 2D PIC simulations (FIGS. 2D1 to 2D4) using the code TurboWave [22] show the electron density profiles just before and 250 fs after plasma wavebreaking in the $H_2$ and He jets, it is seen that the hydrogen plasma profile is fully ionized over a wider region than in He, and that post-wavebreaking scatter of the laser pulse and electron heating in hydrogen gives a wider profile at the jet exit.

The outside circle is the outline of the vacuum port, through which the LANEX™ surface was imaged.

FIG. 4.1 illustrates the electron energy spectrum for varying plasma density from a He jet using 9.5 mJ laser pulses and 20 ms gas jet valve open time.

FIG. 4.2 illustrates total charge per shot with >1 MeV energy vs peak plasma density with accelerated electron spectra for varying peak electron density and corresponding total charge accelerated to >1 MeV energy.

FIGS. 5.1 to 5.14 illustrate electron beam profile on the LANEX™ target for selected He plasma densities plotted in FIG. 4.1 showing the sensitivity to plasma density.

More particularly, FIG. 5.1 illustrates electron beam electron beam profile on the LANEX screen target for plasma density $0.25N_{cr}$, (using He jet).

FIG. 5.2 illustrates electron beam profile on the LANEX™ screen target for plasma density $0.33N_{cr}$.

FIG. 5.3 illustrates electron beam profile on the LANEX™ screen target for plasma density $0.40N_{cr}$.

FIG. 5.4 illustrates electron beam profile on the LANEX™ screen target for plasma density $0.43N_{cr}$.

In each of FIGS. 5.1 to 5.4, the outside circle is the outline of the port of the vacuum chamber, through which the LANEX™ surface was imaged.

While the total accelerated charge increases significantly with peak electron density, the normalized electron spectrum does not change noticeably. The beam divergence angle (estimated from an average around the 50% beam intensity contour) is ~150 mrad at $N_e/N_{cr}$=0.25 and increases to ~260 mrad as the electron density is increased to $N_e/N_{cr}$=0.43.

A major concern using a high density continuous flow gas jet is the background pressure buildup inside the target vacuum chamber (chamber 2002 in FIG. 2A), which can prevent the laser pulse from interacting with the highest density part of the jet at the highest intensity owing to ionization-induced defocusing of the pulse.

In order to study the effect of background pressure buildup, first accelerated electron spectra were measured for increasing valve open times (with the laser at 1 kHz and the jet repetition rate at 0.5 Hz).

This is illustrated in FIG. 6.1 that illustrates electron energy spectrum per shot from He gas jet ($N_e/N_{cr}$=0.54) for different valve open times for 10 mJ laser pulses at 1 kHz and the spectrum (×0.1) from a 3D PIC simulation of one shot for $N_e/N_{cr}$=0.5 and 10 mJ;

More particularly, in FIG. 6.1 a He gas jet at $N_e/N_{cr}$=0.54 is driven by 10 mJ laser pulses. It is seen that increasing the valve open time lowers the charge per shot while keeping the normalized spectra similar, with the charge at >1 MeV decreasing from ~1.6 pC to ~0.2 pC over the opening times 1 ms-100 ms, over which the corresponding background pressure increased from <0.1 Torr to ~3.5 Torr.

Increasing the valve open time to 1 sec, with a repetition rate of 0.5 Hz, increases the background pressure to a constant ~20 Torr. Scanning a 50 ms window (containing a 50 shot burst of 10 mJ pulses) over the 1 sec valve opening of the He jet gives a nearly unchanging LANEX™ signal. This shows that the valve could be open continuously if the accumulation of gamma ray dose from our beam stop was not a constraint.

To better understand SM-LWF generation and acceleration in our jet at electron densities above quarter critical ($N_e/N_{cr}$>0.25), 2D particle-in-cell simulations were performed for 4 mJ laser pulses interacting with a 200 μm FWHM preionized $H_2$ target with peak $N_e/N_{cr}$=0.5. These simulations are plotted in FIGS. 7.3 and 7.4, described below.

FIG. 6.2 illustrates total charge per shot accelerated to >1 MeV vs. valve open time with corresponding background pressure depicted on the top axis.

In FIG. 6.1, the dashed blue line 60 shows the spectrum (×0.1) from a 3D PIC simulation of one shot for $N_e/N_{cr}$=0.5 and 10 mJ.

FIG. 7.1 illustrates a simulated plasma wake just before wavebreaking for a 4 mJ pulse interacting with 200 μm FWHM preionized $H_2$ target of peak $N_e/N_{cr}$=0.5.

FIG. 7.2 illustrates the simulated plasma wake just after wavebreaking for the 4 mJ pulse interacting with 200 μm FWHM preionized $H_2$ target of peak $N_e/N_{cr}$=0.5.

FIG. 7.3 illustrates the corresponding central lineout of density profile $N_e/N_{cr}$ (blue) 731 and normalized vector potential $a_0$. (red) 732 before wavebreaking. The normalized vector potential scale appears on FIG. 7.4. The horizontal dashed line 730 indicates quarter-critical electron density ($N_e/N_{cr}$=0.25).

FIG. 7.3' illustrates pre-wavebreaking spectrum of the self-modulated laser showing anti-Stokes line, with Stokes line suppressed.

FIG. 7.4 illustrates the central lineout of density profile (blue) and normalized vector potential (red) after wavebreaking.

The wakefield is generated at ambient plasma density above quarter critical (dashed line 730), where the Raman Stokes line is suppressed and the anti-Stokes line dominates, as seen in the spectrum shown. Two-plasmon decay is not evident over the full laser propagation, possibly due to the strongly nonlinearly steepened density in the plasma wake [23].

For the prior experiments at high density, PIC simulations showed that both LWFA and direct laser acceleration (DLA) contributed to electron energy gain, with LWFA dominating at lower laser pulse energies [15]. For the later experiments with ≤10 mJ pulses, PIC simulations show that LWFA dominates DLA up to the highest plasma densities used. The simulations also show that the leading part of electron bunch is 30-60 fs FWHM for the subject range of laser and plasma conditions, followed by a longer (>100 fs) and weaker low energy tail. The simulated spectrum, shown in FIG. 6.1, indicates approximately 10× more charge than measured, along with a higher effective temperature than in the experimental spectra, differences we are currently trying to resolve.

Based on the foregoing description, and referring to FIGS. 1, 1A, 1A' and 2A, it can understood that the present disclosure relates to referring to FIG. 1 as genetic to FIGS. 1A, 1A' and 2A, laser-plasma-based acceleration system 1000 that includes a focusing element 1020, a laser pulse emission source, e.g., drive laser source 1010, that is configured and disposed to direct a laser beam 100 to the focusing element 1020 to enable emission of a laser beam such that the laser pulses transform into a focused beam 110 defining a longitudinal center line axis X-X, and a chamber 1154 defining a nozzle 1156 having a throat and an exit orifice 1158. The nozzle 1156 is configured and disposed to enable emission of a critical density range gas jet 1160 from the exit orifice 1158 of the nozzle 1156, for laser wavelengths ranging from ultraviolet to the mid-infrared.

The critical density range gas jet 1160 exits the exit orifice 1158 of the nozzle 1156 and defines a longitudinal center line axis Y-Y that intersects the longitudinal center line axis X-X of the focused beam 110 at an angle θ, wherein the focused beam 110 intersects the critical density range gas jet 1160 in proximity to the exit orifice 1158 of the nozzle 1156 to define a point of intersection 1200 between the focused beam 110 and the critical density range gas jet 1160. In the intersection with the critical density range gas jet 1160. the pulsed focused beam 110 drives a laser plasma wakefield relativistic electron beam 120.

The critical density range is an electron density $N_e$ that is defined to be $0.1N_{cr}<N_e<3N_{cr}$, where the critical density is $N_{cr}=1.12\times10^{21}\lambda^{-2}$ ($cm^{-3}$), where λ is the laser wavelength in microns (μm). For example, for λ=0.8 μm, $N_{cr}=1.74\times^{21}$ $cm^{-3}$. Although $N_e$ is specified as $0.1N_{cr}<N_e<3N_{cr}$, values outside of this range for $N_e$ may also effect desirable results e.g. 0.06 $N_{cr}<N_e<3N_{cr}$.

The critical density range gas jet 1160 generates electron densities $N_e$, upon laser interaction, in the approximate range 0.1 $N_{cr}$ to $3N_{cr}$.

For a laser wavelength of λ=0.8 μm of the focused beam, the critical density range includes $2\times10^{20}$ $cm^{-3}$ to $5\times10^{21}$ $cm^{-3}$. Although the critical density range is specified as including $2\times10^{20}$ $cm^{-3}$ to $5\times10^{21}$ $cm^{-3}$, values outside of this range for the critical density range may also effect desirable results, e.g. $1\times10^{20}$ $cm^{-3}$ to $5\times10^{21}$ $cm^{-3}$.

The critical density range of the critical density range gas jet 1150 is formed by cryogenic cooling of a gas source, e.g., jet gas source 1110, in fluid communication with the chamber 1154 defining the nozzle 1156.

The laser wavelengths ranging from ultraviolet to mid-infrared include wavelengths ranging from 0.3 μm to 2 μm. The laser pulses are at an energy level up to and including 20 mJ.

Note that although the general objective of a user of the laser-plasma-based acceleration system, 1000 (or 2000) is to minimize energy input, the laser-plasma-based acceleration system, 1000 (or 2000) may also be effected by laser pulses that are at an energy level greater than 20 mJ and desirably not greater than 100 mJ, although even higher energy levels may be employed if desired.

The present disclosure relates also to a method of laser-plasma-based acceleration that includes directing a laser beam, e.g., laser beam 100, to a focusing element, e.g., focusing element 1020, to enable emission of a laser beam, e.g., laser beam 100, such that the laser pulses transform into a focused beam, e.g., focused beam 110, defining a longitudinal center line axis X-X, emitting a critical density range gas jet 1160 from the exit orifice 1158 of nozzle 1156, for laser wavelengths ranging from ultraviolet to mid-infrared. and causing the focused beam, e/g., focused beam 110, to intersect the critical density range gas jet 1160 in proximity to the exit orifice 1158 of the nozzle 1156 to define a point of intersection 1200 between the focused beam 110 and the critical density range gas jet 1160, wherein in intersection with the critical density range gas jet 1160. the pulsed focused beam 110 drives a laser plasma wakefield relativistic electron beam 120.

The emitting a critical density range gas may be emitting a critical density range gas at a critical electron density that 0.1 $N_{cr}<N_e<3N_{cr}$, where the critical density is $N_{cr}=1.12\times10^{21}\lambda^{-2}$ ($cm^{-3}$), where λ is the laser wavelength in microns (μm). For example, for λ=0.8 μm, $N_{cr}=1.74\times^{21}$ $cm^{-3}$. Although $N_e$ is specified as $0.1N_{cr}<N_e<3N_{cr}$, values outside of this range for $N_e$ may also effect desirable results e.g. $0.06N_{cr}<N_e<3N_{cr}$.

Similarly, the critical density range gas jet generates electron densities $N_e$, upon laser interaction, in the approximate range 0.1 $N_{cr}$ to $3N_{cr}$.

Similarly, for a laser wavelength of λ=0.8 μm of the focused beam, the critical density range includes $2\times10^{20}$ $cm^{-3}$ to $5\times10^{21}$ $cm^{-3}$. Although the critical density range is specified as including $2\times10^{20}$ $cm^{-3}$ to $5\times10^{21}$ $cm^{-3}$, values outside of this range for the critical density range may also effect desirable results, e.g. $1\times10^{20}$ $cm^{-3}$ to $5\times10^{21}$ $cm^{-3}$.

The method may include the critical density range of the critical density range gas jet being formed by cryogenic cooling of a gas source in fluid communication with the chamber defining the nozzle.

Similarly, the laser wavelengths may range from ultraviolet to mid-infrared to include wavelengths ranging from 0.3 μm to 2 μm.

The method may include wherein the laser pulses are at an energy level up to and including 20 mJ.

In a similar manner, note that although the general objective of a user of the method of laser-plasma-based acceleration is to minimize energy input, the method of laser-plasma-based acceleration may also be effected by laser pulses that are at an energy level greater than 20 mJ and desirably not greater than 100 mJ, although even higher energy levels may be employed if desired.

In summary, the based on the foregoing discussion, the present disclosure relates to laser driven electron acceleration to >1 MeV in a gas jet using a 1 kHz repetition rate mJ-scale laser, with bunch charge to the pC level. This result was made possible by use of a thin, dense, gas jet target enabling critical density range laser interaction. Such a high repetition rate, high flux ultrafast source has application to time resolved probing of matter for scientific, medical, or security applications, either using the electrons directly or using a high-Z foil converter to generate ultrafast γ-rays.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

The references identified in this list of references are each incorporated by reference herein in their entirety:

1. T. Tajima and J. M. Dawson, “Laser electron accelerator,” Phys. Rev. Lett. 43, 267 (1979).
2. W. P. Leemans, A. J. Gonsalves, H. S. Mao, K. Nakamura, C. Benedetti, C. B. Schroeder, Cs. Toth, J. Daniels, D. E. Mittelberger, S. S. Bulanov, J. L. Vay, C. G. R. Geddes, and E. Esarey, “Multi-Gev electron beams from capillary-discharge-guided subpetawatt laser pulses in the self-trapping regime,” Phys. Rev. Lett. 113, 245002 (2014).
3. S. Cipiccia, M. R. Islam, B. Ersfeld, R. P. Shanks, E. Brunetti, G. Vieux, X. Yang, R. C. Issac, S. M. Wiggins, G. H. Welsh, M. P. Anania, D. Maneuski, R. Montgomery, G. Smith, M. Hoek, D. J. Hamilton, N. R. C. Lemos, D. Symes, P. P. Rajeev, V. O. Shea, J. M. Dias, and D. A. Jaroszynski, “Gamma-rays from harmonically resonant betatron oscillations in a plasma wake,” Nat. Phys. 7, 867 (2011).
4. S. P. D. Mangles, B. R. Walton, Z. Najmudin, A. E. Dangor, K. Krushelnick, V. Malka, M. Manclossi, N. Lopes, C. Carias, G. Mendes, and F. Dorchies, “Table-top laser-plasma acceleration as an electron radiography source,” Laser Part. Beams 24, 185 (2006).
5. C. G. Bussolino, A Faenov, A Giulietti, D. Giulietti, P. Koester, L. Labate, T. Levato, T. Pikuz, and L. A. Gizzi, “Electron radiography using a table-top laser-cluster plasma accelerator,” J. Phys. D. Appl. Phys. 46, 245501 (2013).
6. A. Döpp, E. Guillaume, C. Thaury, A. Lifschitz, F. Sylla, J. Goddet, A. Tafzi, G. Iaquanello, T. Lefrou, P. Rousseau, E. Conejero, C. Ruiz, K. T. Phuoc, and V. Malka, “A bremsstrahlung gamma-ray source based on stable ionization injection of electrons into a laser wakefield accelerator,” Nucl. Instruments Methods Phys. Res. A 830, 515 (2016).
7. R. D. Edwards, M. A. Sinclair, T. J. Goldsack, K. Krushelnick, F. N. Beg, E. L. Clark, A. E. Dangor, Z. Najmudin, M. Tatarakis, B. Walton, M. Zepf, K. W. D. Ledingham, I. Spencer, P. A. Norreys, R. J. Clarke, R. Kodama, Y. Toyama, and M. Tampo, “Characterization of a gamma-ray source based on a laser-plasma accelerator with applications to radiography,” Appl. Phys. Lett. 80, 2129 (2002).
8. Z. H. He, B. Hou, J. A. Nees, J. H. Easter, J. Faure, K. Krushelnick, and A. G. R. Thomas, “High repetition-rate wakefield electron source generated by few-millijoule, 30 fs laser pulses on a density downramp,” New J. Phys. 15, 053016 (2013).
9. Z. H. He, A. G. R. Thomas, B. Beaurepaire, J. A. Nees, B. Hou, V. Malka, K. Krushelnick, and J. Faure, “Electron diffraction using ultrafast electron bunches from a laser-wakefield accelerator at kHz repetition rate,” Appl. Phys. Lett. 102, 064104 (2013).
10. A. G. Mordovanakis, J. Easter, N. Naumova, K. Popov, P. E. Masson-Laborde, B. Hou, I. Sokolov, G. Mourou, I. V. Glazyrin, W. Rozmus, V. Bychenkov, J. Nees, and K. Krushelnick, “Quasimonoenergetic electron beams with relativistic energies and ultrashort duration from laser-solid interactions at 0.5 kHz,” Phys. Rev. Lett. 103, 235001 (2009).
11. S. Feister, D. R. Austin, J. T. Morrison, K. D. Frische, C. Orban, G. Ngirmang, A. Handler, M. Schillaci, E. a. Chowdhury, R. R. Freeman, and W. M. Roquemore, “Super-ponderomotive electron spectra from efficient, high-intensity, kHz laser-water interactions,” https://arxiv.org/abs/1508.07374v2 (2015).
12. R. J. D. Miller, “Femtosecond Crystallography with Ultrabright Electrons and X-rays: Capturing Chemistry in Action,” Science 343, 1108 (2014)
13. E. Esarey, C. B. Schroeder, and W. P. Leemans, “Physics of laser-driven plasma-based electron accelerators,” Rev. Mod. Phys. 81, 1229 (2009).
14. G. Z. Sun, E. Ott, Y. C. Lee, and P. Guzdar, “Self-focusing of short intense pulses in plasmas,” Phys. Fluids 30, 526 (1987).
15. A. J. Goers, G. A. Hine, L. Feder, B. Miao, F. Salehi, J. K. Wahlstrand, and H. M. Milchberg, “Multi-MeV Electron Acceleration by Subterawatt Laser Pulses,” Phys. Rev. Lett. 115, 194802 (2015).
16. C. Z. Xiao, Z. J. Liu, C. Y. Zheng, and X. T. He, “Competition between stimulated Raman scattering and two-plasmon decay in inhomogeneous plasma,” Phys. Plasmas 23, 022704 (2016).
17. T. R. Clark and H. M. Milchberg, “Time- and space-resolved density evolution of the plasma waveguide,” Phys. Rev. Lett. 78, 2373 (1997).
18. National Institute of Standards and Technology, 2010, “ESTAR, Stopping Power and Range Tables for Electrons” http://physics.nist.gov/PhysRefData/Star/Text/ESTAR.html.
19. Y. Glinec, J. Faure, A. Guemnie-Tafo, V. Malka, H. Monard, J. P. Larbre, V. De Waele, J. L. Marignier, and M. Mostafavi, “Absolute calibration for a broad range single shot electron spectrometer,” Rev. Sci. Instrum. 77, 103301 (2006).
20. A. Buck, K. Zeil, A. Popp, K. Schmid, A. Jochmann, S. D. Kraft, B. Hidding, T. Kudyakov, C. M. S. Sears, L. Veisz, S. Karsch, J. Pawelke, R. Sauerbrey, T. Cowan, F. Krausz, and U. Schramm, “Absolute charge calibration of scintillating screens for relativistic electron detection,” Rev. Sci. Instrum. 81, 033301 (2010).
21. S. Augst, D. D. Meyerhofer, D. Strickland, and S. L. Chin, “Laser Ionization of Noble-Gases By Coulomb-Barrier Suppression,” J. Opt. Soc. Am. B 8, 858 (1991).
22. D. F. Gordon, “Improved Ponderomotive Guiding Center Algorithm,” IEEE Trans. Plasma Sci. 35, 1486 (2007).
23. A. B. Langdon, B. F. Lasinski, and W. L. Kruer, “Nonlinear Saturation and Recurrence of the Two-Plasmon Decay Instability,” Phys. Rev. Lett. 43, 133 (1979).
24. Goers, A. J., Hine, G. A., Feder L., Miao, B., Salehi, F., Wahlstrand, J. K., & Milchberg, H. M. (2015). Multi-MeV electron acceleration by subterawatt laser pulses. *Physical review letters,* 115(19), 194802.
25. Salehi, F., Goers, A. J., Hine, G. A., Feder, L., Kuk, D., Miao, B., . . . & Milchberg, H. M. (2017). MeV electron acceleration at 1 kHz with <10 mJ laser pulses. *Optics letters,* 42 (2), 215-218.
A1. Y. Glinec et al., Rev. Sci. Instrum. 77, 103301 (2006); A. Buck et al., Rev. Sci. Instrum. 81, 033301 (2010).
A2. G. Schmidt and W. Horton, Comments Plasma Phys. 9, 85 (1985); G. Z. Sun, E. Ott, Y. C. Lee, and P. Guzdar, Phys. Fluids 30, 526 (1987).

What is claimed is:

1. A laser-plasma-based acceleration system comprising:

a focusing element;

a laser pulse emission source configured and disposed to direct a laser beam to the focusing element to enable emission of a laser beam such that the laser pulses transform into a focused beam defining a longitudinal center line axis; and a chamber defining a nozzle having a throat and an exit orifice, the nozzle configured and disposed to enable emission of a critical density range gas jet from the exit orifice of the nozzle, for laser wavelengths ranging from ultraviolet to the mid-infrared, the critical density range gas jet exiting the exit orifice of the nozzle and defining a longitudinal center line axis that intersects the longitudinal center line axis of the focused beam at an angle, wherein the focused beam intersects the critical density range gas jet in proximity to the exit orifice of the nozzle to define a point of intersection between the focused beam and the critical density range gas jet, wherein, in intersection with the critical density range gas jet, the pulsed focused beam drives a laser plasma wakefield relativistic electron beam, and wherein the plasma wakefield relativistic electron beam energy is at least 0.5 MeV with charge electron bunches greater than 10 femto coulombs wherein the focused laser energy is less than or equal to 10 mJ.

2. The laser-plasma-based acceleration system according to claim 1, wherein the critical density range is an electron density $N_e$ that is defined to be 0.1 $N_{cr}$ $<N_e<3N_{cr}$, where the critical density is $N_{cr}=1.12\times10^{21}$ $\lambda^{-2}$ ($cm^{-3}$), where $\lambda$ is the laser wavelength in microns (μm).

3. The laser-plasma-based acceleration system according to claim 1, wherein the critical density range gas jet generates electron densities $N_e$, upon laser interaction, in the approximate range 0.1 $N_{cr}$ to $3N_{cr}$.

4. The laser-plasma-based acceleration system according to claim 1, wherein for a laser wavelength of $\lambda$=0.8 μm of the focused beam, the critical density range includes $2\times10^{20}$ $cm^{-3}$ to $5\times10^{21}$ $cm^{-3}$.

5. The laser-plasma-based acceleration system according to claim 1, wherein the critical density range of the critical density range gas jet is formed by cryogenic cooling of a gas source in fluid communication with the chamber defining the nozzle.

6. The laser-plasma-based acceleration system according to claim 1, wherein the laser wavelengths ranging from ultraviolet to mid-infrared include wavelengths ranging from 0.3 μm to 2 μm.

7. The laser-plasma-based acceleration system according to claim 1, wherein the laser pulses are at an energy level up to and including 20 mJ.

8. A method of laser-plasma-based acceleration comprising:

directing a laser beam to a focusing element to enable emission of a laser beam such that the laser pulses transform into a focused beam defining a longitudinal center line axis;

emitting a critical density range gas jet from an exit orifice of a nozzle for laser wavelengths ranging from ultraviolet to mid-infrared;

causing the focused beam to intersect the critical density range gas jet in proximity to the exit orifice of the nozzle to define a point of intersection between the focused beam and the critical density range gas jet, wherein, in intersection with the critical density range gas jet, the pulsed focused beam drives a laser plasma wakefield relativistic electron beam, and wherein the plasma wakefield relativistic electron beam energy is at least 0.5 MeV with charge electron bunches greater than 10 femto coulombs wherein the focused laser energy is less than or equal to 10 mJ.

9. The method of laser-plasma-based acceleration according to claim 8, wherein the emitting a critical density range gas is emitting a critical density range gas at a critical electron density that is an electron density $N_e$ that is defined to be 0.1 $N_{cr}$ $<N_e<3N_{cr}$, where the critical density is $N_{cr}=1.12\times10^{21}\lambda^{-2}$ ($cm^{-3}$), where $\lambda$ is the laser wavelength in microns (μm).

10. The method of laser-plasma-based acceleration according to claim 8, wherein the critical density range gas jet generates electron densities $N_e$, upon laser interaction, in the approximate range 0.1 $N_{cr}$ to $3N_{cr}$.

11. The method of laser-plasma-based acceleration according to claim 8, wherein for a laser wavelength of $\lambda$=0.8 μm of the focused beam, the critical density range includes $2\times10^{20}$ $cm^{-3}$ to $5\times10^{21}$ $cm^{-3}$.

12. The method of laser-plasma-based acceleration according to claim 8, wherein the critical density range of the critical density range gas jet is formed by cryogenic cooling of a gas source in fluid communication with the chamber defining the nozzle.

13. The method of laser-plasma-based acceleration according to claim 8, wherein the laser wavelengths ranging from ultraviolet to mid-infrared include wavelengths ranging from 0.3 μm to 2 μm.

14. The method of laser-plasma-based acceleration according to claim 8, wherein the laser pulses are at an energy level up to and including 20 mJ.

15. The laser-plasma-based acceleration system according to claim 1, wherein the laser pulse repetition rate is 1 kHz.

16. The method of laser-based acceleration according to claim 8, wherein the laser pulses transform into a focused beam defining a longitudinal center line axis at a repetition rate of 1 kHz.

17. A laser-plasma-based acceleration system comprising:

a focusing element;

a laser pulse emission source configured and disposed to direct a laser beam to the focusing element to enable emission of a laser beam such that the laser pulses transform into a focused beam defining a longitudinal center line axis; and a chamber defining a nozzle having a throat and an exit orifice, the nozzle configured and disposed to enable emission of a critical density range gas jet from the exit orifice of the nozzle, for laser wavelengths ranging from ultraviolet to the mid-infrared, the critical density range gas jet exiting the exit orifice of the nozzle and defining a longitudinal center line axis that intersects the longitudinal center line axis of the focused beam at an angle, wherein the focused beam intersects the critical density range gas jet in proximity to the exit orifice of the nozzle to define a point of intersection between the focused beam and the critical density range gas jet, wherein, in intersection with the critical density range gas jet, the pulsed focused beam drives a laser plasma wakefield relativistic electron beam, and wherein the plasma wakefield relativistic electron bunch energy is at least 0.5 MeV with charge greater than 10 femto coulombs wherein the focused laser energy is less than or equal to 10 mJ.

18. The laser-plasma-based acceleration system according to claim 17, wherein the laser pulse repetition rate is 1 kHz.

19. A method of laser-plasma-based acceleration comprising:

directing a laser beam to a focusing element to enable emission of a laser beam such that the laser pulses transform into a focused beam defining a longitudinal center line axis;

emitting a critical density range gas jet from an exit orifice of a nozzle for laser wavelengths ranging from ultraviolet to mid-infrared;

causing the focused beam to intersect the critical density range gas jet in proximity to the exit orifice of the nozzle to define a point of intersection between the focused beam and the critical density range gas jet, wherein, in intersection with the critical density range gas jet, the pulsed focused beam drives a laser plasma wakefield relativistic electron beam, and wherein the plasma wakefield relativistic electron bunch energy is at least 0.5 MeV with charge greater than 10 femto coulombs wherein the focused laser energy is less than or equal to 10 mJ.

20. The method of laser-based acceleration according to claim 19, wherein the laser pulses transform into a focused beam defining a longitudinal center line axis at a repetition rate of 1 kHz.

* * * * *